United States Patent
Yu et al.

(10) Patent No.: US 12,299,595 B2
(45) Date of Patent: May 13, 2025

(54) MODEL SELECTION METHOD AND TERMINAL

(71) Applicant: HUAWEI TECHNOLOGIES CO., LTD., Shenzhen (CN)

(72) Inventors: Chao Yu, Shenzhen (CN); Xinyu Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 943 days.

(21) Appl. No.: 17/329,414

(22) Filed: May 25, 2021

(65) Prior Publication Data
US 2021/0279613 A1 Sep. 9, 2021

Related U.S. Application Data

(63) Continuation of application No. PCT/CN2018/117534, filed on Nov. 26, 2018.

(51) Int. Cl.
*G06N 5/04* (2023.01)

(52) U.S. Cl.
CPC ...................... *G06N 5/04* (2013.01)

(58) Field of Classification Search
None
See application file for complete search history.

(56) References Cited

U.S. PATENT DOCUMENTS

| | | | |
|---|---|---|---|
| 8,301,406 B2 | 10/2012 | Lee et al. | |
| 11,693,693 B2 * | 7/2023 | Chen | G06F 18/22 712/220 |
| 2015/0185995 A1 | 7/2015 | Shoemaker et al. | |
| 2016/0275413 A1 | 9/2016 | Shi et al. | |
| 2018/0032505 A1 | 2/2018 | Hoetzer et al. | |
| 2018/0188906 A1 * | 7/2018 | Carter | G06F 3/0482 |
| 2020/0160229 A1 * | 5/2020 | Atcheson | G06N 20/00 |
| 2021/0065040 A1 * | 3/2021 | Eberlein | G06F 9/451 |

(Continued)

FOREIGN PATENT DOCUMENTS

| | | |
|---|---|---|
| CN | 102204814 A | 10/2011 |
| CN | 104753765 A | 7/2015 |

(Continued)

OTHER PUBLICATIONS

Ekin D. Cubuk et al, AutoAugment: Learning Augmentation Strategies from Data, arXiv:1805.09501v2 [cs.CV] Oct. 9, 2018, 14 pages.

*Primary Examiner* — Ryan Barrett
(74) *Attorney, Agent, or Firm* — Rimon PC

(57) ABSTRACT

A model selection method and a terminal are provided. The method includes: A terminal obtains first behavior data generated when a user operates the terminal. The terminal selects a first model from a plurality of stored models. The terminal runs the first model by using the first behavior data as an input parameter of the first model, to obtain a first output result. The terminal provides a first artificial intelligence AI service based on the first output result. When the first model does not meet a condition, the terminal selects a second model from the plurality of models. The terminal runs the second model by using second behavior data as an input parameter of the second model, to obtain a second output result. The terminal continues to provide the first AI service based on the second output result.

20 Claims, 8 Drawing Sheets

(56) References Cited

U.S. PATENT DOCUMENTS

2022/0286402 A1\* 9/2022 Wang ................. H04L 47/28
2023/0274144 A1\* 8/2023 Ren ..................... G06N 3/084
　　　　　　　　　　　　　　　　　　706/15

FOREIGN PATENT DOCUMENTS

| CN | 105068661 | A | 11/2015 |
| CN | 107030691 | A | 8/2017 |
| CN | 107480587 | A | 12/2017 |
| CN | 107544981 | A | 1/2018 |
| CN | 107766940 | A | 3/2018 |
| CN | 107958268 | A | 4/2018 |
| CN | 108057249 | A | 5/2018 |
| CN | 108268460 | A | 7/2018 |
| WO | 2016196435 | A2 | 12/2016 |

\* cited by examiner

| App to be tapped next time | App currently tapped | App tapped last time | App tapped penultimate time | App tapped third-to-last time | App tapped fourth-to-last time | App tapped fifth-to-last time | App tapped sixth-to-last time | App tapped seventh-to-last time | |
|---|---|---|---|---|---|---|---|---|---|
| | JD (4) | Tmall (2) | Taobao (1) | WeChat (3) | Alipay (6) | Meituan (5) | JD (4) | WeChat (3) | ... |
| | | | | | | | | | ... |

FIG. 3

| Serial number | App tapped penultimate time | App tapped last time | App currently tapped |
|---|---|---|---|
| 1 | Taobao (1) | Tmall (2) | WeChat (3) |
| 2 | JD (4) | Taobao (1) | Tmall (2) |
| 3 | Meituan (5) | JD (4) | Taobao (1) |
| 4 | Alipay (6) | WeChat (3) | JD (4) |

| Model 1 (decision tree) | |
|---|---|
| Model parameter 1 | Quantity of a subnode: 4 |
| | Quantity of a layer: 3 |
| | Intermediate value (5, 1.5, and 3.5) |
| Model parameter 2 | Quantity of the subnode: 3 |
| | Quantity of the layer: 3 |
| | Intermediate value (5 and 1.5) | ns
MODEL SELECTION METHOD AND TERMINAL

CROSS-REFERENCE TO RELATED APPLICATIONS

This application is a continuation of International Application No. PCT/CN2018/117534, filed on Nov. 26, 2018, which is hereby incorporated by reference in its entirety.

TECHNICAL FIELD

This application relates to the field of terminal technologies, and in particular, to a model selection method and a terminal.

BACKGROUND

With rapid development of artificial intelligence (AI) technologies, AI software and AI hardware are integrated into an increasing quantity of terminals, to provide users with AI-related services such as entertainment, work, and learning, to meet people's demand for terminal smart-up.

In the prior art, implementation of the AI-related services by the terminals relies on model computation. Specifically, the terminal may collect characteristic data and use the characteristic data as an input parameter of a model; the mobile terminal runs the model to obtain an output result; and the terminal provides the AI-related service based on the output result.

Currently, the terminal always uses a same model when implementing a same AI-related function. In this case, only a single model is selected, and model selection is not flexible enough, and cannot meet a terminal smart-up trend.

SUMMARY

This application provides a model selection method and a terminal, to improve flexibility in model selection and better adapt to requirements of various AI functions.

According to a first aspect, an embodiment of this application provides a model selection method. The method may be performed by a terminal (for example, a mobile phone, an iPad, or a notebook computer). The method includes: A terminal obtains first behavior data generated when a user operates the terminal. The terminal selects, according to a preset policy, a first model from a plurality of models stored on the terminal. The terminal runs the first model by using the first behavior data as an input parameter of the first model, to obtain a first output result. The terminal provides a first artificial intelligence AI service based on the first output result. The terminal reselects a second model from the plurality of models when the first model does not meet a condition. The terminal runs the second model by using second behavior data as an input parameter of the second model, to obtain a second output result, where the second behavior data is generated after the first behavior data, and is a same behavior of operating the terminal by the user. The terminal continues to provide the first AI service based on the second output result.

In this embodiment of this application, a process in which the terminal provides an AI service is as follows: The terminal selects the first model from the plurality of models, and provides the AI service by using the first model (uses user behavior data as the input parameter of the first model to obtain an output result, and provides the AI service based on the output result). For example, the terminal predicts, by using a model, an application that the user may tap next time (output result), and then preloads the application. Usually, a behavior that the user operates the terminal changes in real time. Therefore, if the terminal always uses the first model, an output result may be inaccurate. For example, the terminal predicts, by using the first model, that the user may tap Taobao next time, but the user actually taps a game app next time. If this case happens for a plurality of times, it indicates that the first model is inaccurate (the first model does not meet the condition). In this case, the terminal may reselect the second model, and continue to provide the AI service by using the second model. In this process, the terminal may use different models in the process of providing the AI service, thereby improving flexibility in model selection, providing the AI service more accurately, and improving user experience.

In a possible design, before the terminal runs the first model by using the first behavior data as an input parameter of the first model, the terminal evaluates the first model. That the terminal runs the first model by using the first behavior data as an input parameter of the first model includes: When a result of evaluating the first model meets the condition, the terminal runs the first model by using the first behavior data as the input parameter of the first model, to obtain an output result.

In this embodiment of this application, before using a model, the terminal may evaluate the model. The terminal uses the model only when an evaluation result meets the condition. When the evaluation result does not meet the condition, the terminal may perform model reselection. In this manner, it helps select a model with a better evaluation, thereby improving accuracy of model selection.

In a possible design, before the terminal evaluates the first model, the terminal determines a value of the input parameter and a value of an output parameter; and the terminal substitutes the determined value of the input parameter and the determined value of the output parameter into a formula of the first model, and determines a value of a model parameter of the first model, where the model parameter is a value of a parameter of the first model other than the input parameter and the output parameter. Alternatively, the terminal determines, based on a correspondence between a model and a value of a model parameter, a value that is of a model parameter and that is corresponding to the first model.

In this embodiment of this application, a formula of a model includes an input parameter, an output parameter, and a model parameter. Before evaluating the model, the terminal may determine a value of the model parameter. Specifically, the terminal may determine the value of the model parameter in two manners. For example, the terminal substitutes a known value of the input parameter and a known value of the output parameter into the formula of the model, to obtain the value of the model parameter. This manner helps improve accuracy of determining the value of the model parameter. For another example, the correspondence between a model and a value of a model parameter is stored on the terminal in advance, and the terminal may select the value of the model parameter based on the correspondence. This manner is comparatively simple, and helps improve computing efficiency.

In a possible design, that the terminal evaluates the first model includes: The terminal obtains third behavior data generated when the user operates the terminal, where the third behavior data is generated before the first behavior data. The terminal runs the first model by using the third behavior data as the input parameter of the first model, to obtain a test result. The terminal compares the test result with an actual result, where the actual result is an actual operation of the user performed after the third behavior data is obtained. If the test result is consistent with the actual result, the result of evaluating the first model meets the condition. If the test result is inconsistent with the actual result, the result of evaluating the first model does not meet the condition.

In this embodiment of this application, a process in which the terminal evaluates a model is as follows: The terminal obtains a test result by using the model, and compares the test result with an actual result. If the test result is consistent with the actual result, a result of evaluating the model meets the condition. If the test result is inconsistent with the actual result, a result of evaluating the model does not meet the condition. This manner helps select a model with a better evaluation, thereby improving accuracy of model selection.

In a possible design, that the terminal selects a first model from a plurality of models according to a preset policy includes: The terminal randomly selects the first model from the plurality of models; the terminal selects a model with the largest Q value according to a Q-table, where the Q-table includes a Q value corresponding to each model, and the Q value is related to a result of evaluating each model; or the terminal selects, based on a current service, the first model corresponding to the current service.

In this embodiment of this application, the terminal selects a model from a plurality of models in a plurality of manners, for example, selects a model based on a service. For example, different models may be selected for two services: predicting an app to be tapped next time and predicting a category of a commodity to be tapped next time. In this manner, it helps improve accuracy of model selection.

In a possible design, the first output result is a next possible behavior of the user predicted after the first behavior data is obtained, and that the terminal reselects a second model from the plurality of models when the first model does not meet a condition includes: When the next possible behavior of the user predicted by using the model is different from a next actual behavior of the user, the terminal reselects the second model; or when duration of using the first model reaches preset duration, the terminal reselects the second model.

In this embodiment of this application, an output result obtained by the terminal by using a model is a predicted next possible behavior of the user. Therefore, in a process in which the terminal provides an AI service by using a model selected last time, if the model selected last time cannot accurately predict a next possible behavior of the user, or when the model selected last time is used for a comparatively long time, the terminal reselects another model. In this manner, it helps improve accuracy of model selection, and further, the next possible behavior of the user can be more accurately predicted.

In a possible design, the first behavior data or the second behavior data includes applications that the user taps last three times, and the first output result or the second output result is an application that the user may tap next time.

In this embodiment of this application, the terminal can predict the application that the user may tap next time, to provide a corresponding AI service (for example, preloading the application), thereby improving user experience.

In a possible design, the third behavior data includes applications tapped three consecutive times before an application tapped last time, and the actual result is an application tapped immediately before the applications tapped three consecutive times.

In this embodiment of this application, when the terminal predicts, in a model selection manner provided in this embodiment of this application, an application that the user may tap next time, the third behavior data used when the terminal evaluates the model may be the applications tapped three consecutive times before the application tapped last time. The terminal uses the third behavior data as the input parameter of the model to obtain a test result. If the test result is consistent with the actual result (the application tapped immediately after the applications tapped three consecutive times), the evaluation result meets the condition. If the test result is inconsistent with the actual result, the evaluation result does not meet the condition. In this manner, it helps select a model with a better evaluation, thereby improving accuracy of model selection. Further, the application that the user may tap next time is more accurately predicted, to provide a corresponding AI service (for example, preloading the application), thereby improving user experience.

In a possible design, that the next possible behavior of the user predicted by using the model is different from a next actual behavior of the user includes: An application that the user may tap next time and that is predicted by using the model is different from an application that the user actually taps next time.

In this embodiment of this application, in a process in which the terminal predicts, by using a model selection method provided in this embodiment of this application, an application that the user may tap next time to provide a corresponding AI service, a model may be changed. For example, if the application that the user may tap next time cannot be accurately predicted by using a model selected last time, another model is reselected. In this manner, accuracy of model selection is improved. Further, the application that the user may tap next time is more accurately predicted, to provide a corresponding AI service (for example, preloading the application), thereby improving user experience.

In a possible design, that the terminal provides an AI-related service based on the first output result or the second output result includes: The terminal preloads the application that the user may tap next time; the terminal shuts down another application that is running in the background and that is not the application that the user may tap next time; or the terminal outputs prompt information, where the prompt information is used to prompt the application that the user may tap next time, and when detecting that the user determines the prompt information, the terminal loads the application that the user may tap next time.

In this embodiment of this application, when the terminal predicts, by using the model selection method provided in this embodiment of this application, an application that the user may tap next time to provide a corresponding AI service, the AI service provided by the terminal may include: preloading the application that the user may tap next time; shutting down another application that is running in the background and that is not the application that the user may tap next time; outputting prompt information, where the prompt information is used to prompt the application that the user may tap next time, and when the terminal detects that the user determines the prompt information, loading the application that the user may tap next time; or the like. In this manner, the user operates the terminal conveniently, thereby improving user experience.

In a possible design, the first behavior data or the second behavior data includes categories of commodities that the user taps last three times, and the first output result or the second output result is a category of a commodity that the user may tap next time.

In this embodiment of this application, the terminal can predict the category of the commodity that the user may tap next time, to provide a corresponding AI service (for example, preloading a commodity of the category), thereby improving user experience.

In a possible design, the third behavior data includes a category of a commodity tapped three consecutive times before a category of a commodity tapped last time, and the actual result is a category of a commodity tapped immediately before the category of the commodity tapped three consecutive times.

In this embodiment of this application, when the terminal predicts, in the model selection manner provided in this embodiment of this application, a category of a commodity that the user may tap next time, the third behavior data used when the terminal evaluates the model may be the category of the commodity tapped three consecutive times tapped before the category of the commodity tapped last time. The terminal uses the third behavior data as the input parameter of the model to obtain a test result. If the test result is consistent with the actual result (the category of the commodity tapped immediately after the commodities tapped three consecutive times), the evaluation result meets the condition. If the test result is inconsistent with the actual result, the evaluation result does not meet the condition. In this manner, it helps select a model with a better evaluation, thereby improving accuracy of model selection. Further, the category of the commodity that the user may tap next time is more accurately predicted, to provide a corresponding AI service (for example, preloading a commodity of the category), thereby improving user experience.

In a possible design, that the next possible behavior of the user predicted by using the model is different from a next actual behavior of the user includes: A category that is of a commodity (that the user may tap next time) and that is predicted by using the model is different from a category of a commodity that the user actually taps next time.

In this embodiment of this application, in a process in which the terminal predicts, by using the model selection method provided in this embodiment of this application, a category of a commodity that the user may tap next time to provide a corresponding AI service, a model may be changed. For example, if the category of the commodity that the user may tap next time cannot be accurately predicted by using a model selected last time, another model is selected. In this manner, accuracy of model selection is improved. Further, the category of the commodity that the user may tap next time is more accurately predicted, to provide a corresponding AI service (for example, preloading a commodity of the category), thereby improving user experience.

In a possible design, that the terminal provides an AI-related service based on the first output result or the second output result includes: The terminal preloads a commodity that belongs to the category of the commodity that the user may tap next time; the terminal outputs prompt information, where the prompt information is used to prompt the category of the commodity that the user may tap next time, and when detecting that the user determines the prompt information, the terminal loads a commodity that belongs to the category of the commodity that the user may tap next time; or the terminal outputs prompt information, where the prompt information is used to recommend a category of a commodity of interest to the user, and the category of the commodity of interest is the same as the category of the commodity that the user may tap next time.

In this embodiment of this application, when the terminal predicts, by using the model selection method provided in this embodiment of this application, a category of a commodity that the user may tap next time to provide a corresponding AI service, the AI service provided by the terminal may include: preloading a commodity that belongs to the category of the commodity that the user may tap next time; outputting prompt information, which is used to prompt the category of the commodity that the user may tap next time, and when the terminal detects that the user determines the prompt information, loading a commodity that belongs to the category of the commodity that the user may tap next time; or outputting prompt information, which is used to recommend a category of a commodity of interest to the user. In this manner, the user operates the terminal conveniently, thereby improving user experience.

In a possible design, the first model or the second model is one of a decision tree, a neural unit, a logistic regression (LR) algorithm, a naive Bayesian (NB) classification algorithm, a random forest (RF) algorithm, or a support vector machine (SVM) algorithm.

In this embodiment of this application, the foregoing several models are merely examples, and another model may be alternatively used. This is not limited in this embodiment of this application.

According to a second aspect, an embodiment of this application provides a model selection method. The method may be performed by a server. The method includes: The server receives first behavior data that is sent by a terminal and that is generated when a user operates the terminal. The server selects, according to a preset policy, a first model from a plurality of models stored on the server. The server runs the first model by using the first behavior data as an input parameter of the first model, to obtain a first output result. The server sends the first output result to the terminal, so that the terminal provides a first artificial intelligence AI service based on the first output result. When the first model does not meet a condition, the server selects a second model from the plurality of models. The server runs the second model by using second behavior data as an input parameter of the second model, to obtain a second output result, where the second behavior data is sent by the terminal, is generated after the first behavior data, and is a same behavior of operating the terminal by the user. The server sends the second output result to the terminal, so that the terminal continues to provide the first AI service based on the second output result.

In this embodiment of this application, the terminal may collect behavior data of the user and send the behavior data to the server, and the server selects a model and runs the model to obtain an output result. The terminal provides an AI service based on the output result. Specifically, after selecting a model, the server may perform model selection if the model does not meet the condition. In this manner, it helps improve accuracy of model selection, so that the terminal can obtain a more accurate output result and further provide the AI service more accurately, thereby improving user experience.

In a possible design, before the server runs the first model by using the first behavior data as the input parameter of the first model, the server evaluates the first model. That the server runs the first model by using the first behavior data as an input parameter of the first model includes: When a result of evaluating the first model meets the condition, the server runs the first model by using the first behavior data as the input parameter of the first model, to obtain the first output result.

In a possible design, before the server evaluates the first model, the server determines a value of the input parameter and a value of an output parameter; and the server substitutes the determined value of the input parameter and the determined value of the output parameter into a formula of the first model, and determines a value of a model parameter of the first model, where the model parameter is a value of a parameter of the first model other than the input parameter and the output parameter. Alternatively, the server determines, based on a correspondence between a model and a value of a model parameter, a value that is of a model parameter and that is corresponding to the first model.

In a possible design, that the server evaluates the first model includes: The server obtains third behavior data generated when the user operates the terminal, where the third behavior data is generated before the first behavior data. The server runs the first model by using the third behavior data as the input parameter of the first model, to obtain a test result. The server compares the test result with an actual result, where the actual result is an actual operation of the user performed after the third behavior data is obtained. If the test result is consistent with the actual result, the result of evaluating the first model meets the condition. If the test result is inconsistent with the actual result, the result of evaluating the first model does not meet the condition.

In a possible design, that the server selects a first model from a plurality of models according to a preset policy includes: The server randomly selects the first model from the plurality of models; the server selects a model with the largest Q value according to a Q-table, where the Q-table includes a Q value corresponding to each model, and the Q value is related to a result of evaluating each model; or the server selects, based on a current service of the terminal, the first model corresponding to the current service.

In a possible design, the first output result is a next possible behavior of the user predicted after the first behavior data is obtained, and that the server selects a second model from the plurality of models when the first model does not meet a condition includes: When the next possible behavior of the user predicted by using the model is different from a next actual behavior of the user, the server selects the second model; or when duration of using the first model reaches preset duration, the server selects the second model.

In this embodiment of this application, the terminal may record the next possible behavior of the user predicted by using the model and the next actual behavior of the user. When the next possible behavior of the user predicted by using the model and the next actual behavior of the user are different, the terminal sends a request to the server for model selection.

In a possible design, the first behavior data or the second behavior data includes applications that the user taps last three times, and the first output result or the second output result is an application that the user may tap next time.

In a possible design, the third behavior data includes applications tapped three consecutive times before an application tapped last time, and the actual result is an application tapped immediately before the applications tapped three consecutive times.

In a possible design, that the next possible behavior of the user predicted by using the model is different from a next actual behavior of the user includes: An application that the user may tap next time and that is predicted by using the model is different from an application that the user actually taps next time.

In a possible design, that the terminal provides an AI-related service based on the first output result or the second output result includes: The terminal preloads the application that the user may tap next time; the terminal shuts down another application that is running in the background and that is not the application that the user may tap next time; or the terminal outputs prompt information, where the prompt information is used to prompt the application that the user may tap next time, and when detecting that the user determines the prompt information, the terminal loads the application that the user may tap next time.

In a possible design, the first behavior data or the second behavior data includes categories of commodities that the user taps last three times, and the first output result or the second output result is a category of a commodity that the user may tap next time.

In a possible design, the third behavior data includes a category of a commodity tapped three consecutive times before an application tapped last time, and the actual result is a category of a commodity tapped immediately before the category of the commodity tapped three consecutive times.

In a possible design, that the next possible behavior of the user predicted by using the model is different from a next actual behavior of the user includes: A category that is of a commodity (that the user may tap next time) and that is predicted by using the model is different from a category of a commodity that the user actually taps next time.

In a possible design, that the terminal provides an AI-related service based on the first output result or the second output result includes: The terminal preloads a commodity that belongs to the category of the commodity that the user may tap next time; the terminal outputs prompt information, where the prompt information is used to prompt the category of the commodity that the user may tap next time, and when detecting that the user determines the prompt information, the terminal loads a commodity that belongs to the category of the commodity that the user may tap next time; or the terminal outputs prompt information, where the prompt information is used to recommend a category of a commodity of interest to the user, and the category of the commodity of interest is the same as the category of the commodity that the user may tap next time.

In a possible design, the first model or the second model is one of a decision tree, a neural unit, a logistic regression (LR) algorithm, a naive Bayesian (NB) classification algorithm, a random forest (RF) algorithm, or a support vector machine (SVM) algorithm.

According to a third aspect, an embodiment of this application provides a terminal, including: a behavior log collector, configured to obtain first behavior data generated when a user operates the terminal; an adaptive selector, configured to select, according to a preset policy, a first model from a plurality of models stored on the terminal; and an executor, configured to run the first model by using the first behavior data as an input parameter of the first model, to obtain a first output result. The executor is further configured to provide a first artificial intelligence AI service based on the first output result. The adaptive selector is further configured to select a second model from the plurality of models when the first model does not meet a condition. The executor is further configured to: run the second model by using second behavior data as an input parameter of the second model, to obtain a second output result, and continue to provide the first AI service based on the second output result, where the second behavior data is generated after the first behavior data, and is a same behavior of operating the terminal by the user.

In a possible design, the terminal further includes an evaluator, configured to evaluate the first model. That an executor is configured to run the first model by using the first behavior data as the input parameter of the first model specifically includes: when a result of evaluating the first model meets the condition, running the first model by using the first behavior data as the input parameter of the first model, to obtain the first output result.

In a possible design, the adaptive selector is further configured to: determine a value of the input parameter and a value of an output parameter; and substitute the determined value of the input parameter and the determined value of the output parameter into a formula of the first model, and determine a value of a model parameter of the first model, where the model parameter is a value of a parameter of the first model other than the input parameter and the output parameter. Alternatively, the adaptive selector is further configured to determine, based on a correspondence between a model and a value of a model parameter, a value that is of a model parameter and that is corresponding to the first model.

In a possible design, the evaluator is specifically configured to: obtain third behavior data generated when the user operates the terminal, where the third behavior data is generated before the first behavior data; run the first model by using the third behavior data as the input parameter of the first model, to obtain a test result; and compare the test result with an actual result, where the actual result is an actual operation of the user performed after the third behavior data is obtained. If the test result is consistent with the actual result, the result of evaluating the first model meets the condition. If the test result is inconsistent with the actual result, the result of evaluating the first model does not meet the condition.

In a possible design, the adaptive selector is specifically configured to: randomly select the first model from the plurality of models; select a model with the largest Q value according to a Q-table, where the Q-table includes a Q value corresponding to each model, and the Q value is related to a result of evaluating each model; or select, based on a current service, the first model corresponding to the current service.

In a possible design, the first output result is a next possible behavior of the user predicted after the first behavior data is obtained, and that the adaptive selector is configured to select the second model from the plurality of models, when the first model does not meet the condition is specifically configured to: when the next possible behavior of the user predicted by using the model is different from a next actual behavior of the user, select the second model; or when duration of using the first model reaches preset duration, select the second model.

In a possible design, the first behavior data or the second behavior data includes applications that the user taps last three times, and the first output result or the second output result is an application that the user may tap next time.

In a possible design, the third behavior data includes applications tapped three consecutive times before an application tapped last time, and the actual result is an application tapped immediately before the applications tapped three consecutive times.

In a possible design, that the next possible behavior of the user predicted by using the model is different from a next actual behavior of the user includes: An application that the user may tap next time and that is predicted by using the model is different from an application that the user actually taps next time.

In a possible design, that the executor is configured to provide an AI-related service based on the first output result or the second output result is specifically configured to: preload the application that the user may tap next time; shut down another application that is running in the background and that is not the application that the user may tap next time; or output prompt information, where the prompt information is used to prompt the application that the user may tap next time, and when the terminal detects that the user determines the prompt information, load the application that the user may tap next time.

In a possible design, the first behavior data or the second behavior data includes categories of commodities that the user taps last three times, and the first output result or the second output result is a category of a commodity that the user may tap next time.

In a possible design, the third behavior data includes a category of a commodity tapped three consecutive times before an application tapped last time, and the actual result is a category of a commodity tapped immediately before the category of the commodity tapped three consecutive times.

In a possible design, that the next possible behavior of the user predicted by using the model is different from a next actual behavior of the user includes: A category that is of a commodity (that the user may tap next time) and that is predicted by using the model is different from a category of a commodity that the user actually taps next time.

In a possible design, that the executor is configured to provide an AI-related service based on the first output result or the second output result is specifically configured to: preload a commodity that belongs to the category of the commodity that the user may tap next time; output prompt information, where the prompt information is used to prompt the category of the commodity that the user may tap next time, and when the terminal detects that the user determines the prompt information, load a commodity that belongs to the category of the commodity that the user may tap next time; or output prompt information, where the prompt information is used to recommend a category of a commodity of interest to the user, and the category of the commodity of interest is the same as the category of the commodity that the user may tap next time.

In a possible design, the first model or the second model is one of a decision tree, a neural unit, a logistic regression LR algorithm LR, a naive Bayesian NB classification algorithm, a random forest RF algorithm, or a support vector machine SVM algorithm.

According to a fourth aspect, an embodiment of this application provides a server, including:
  a receiver, configured to receive first behavior data that is sent by a terminal and that is generated when a user operates the terminal;
  a processor, configured to run the first model by using the first behavior data as an input parameter of the first model, to obtain a first output result; and
  a sender, configured to send the first output result to the terminal, so that the terminal provides a first artificial intelligence AI service based on the first output result.

The processor is further configured to: select a second model from a plurality of models when the first model does not meet a condition; and run the second model by using second behavior data as an input parameter of the second model, to obtain a second output result, where the second behavior data is sent by the terminal, is generated after the first behavior data, and is a same behavior of operating the terminal by the user.

The sender is further configured to send the second output result to the terminal, so that the terminal continues to provide the first AI service based on the second output result.

According to a fifth aspect, an embodiment of this application provides a terminal, including a memory and a processor.

The memory is configured to store one or more computer programs, and when the one or more computer programs stored in the memory are executed by the processor, the terminal is enabled to implement the method according to any one of the first aspect or the possible designs of the first aspect.

According to a sixth aspect, an embodiment of this application provides a server, including a memory and a processor.

The memory is configured to store one or more computer programs, and when the one or more computer programs stored in the memory are executed by the processor, the server is enabled to implement the method according to any one of the second aspect or the possible designs of the second aspect.

According to a seventh aspect, an embodiment of this application further provides a terminal. The terminal includes modules/units that perform the method according to any one of the first aspect or the possible designs of the first aspect. These modules/units may be implemented by hardware, or may be implemented by hardware by executing corresponding software.

According to an eighth aspect, an embodiment of this application further provides a server. The server includes modules/units that perform the method according to any one of the second aspect or the possible designs of the second aspect. These modules/units may be implemented by hardware, or may be implemented by hardware by executing corresponding software.

According to a ninth aspect, an embodiment of this application further provides a computer-readable storage medium. The computer-readable storage medium includes a computer program. When the computer program is run on a terminal, the terminal is enabled to perform the method according to any one of the first aspect or the possible designs of the first aspect. Alternatively, when the computer program is run on a server, the server is enabled to perform the method according to any one of the second aspect or the possible designs of the second aspect.

According to a ninth aspect, an embodiment of this application further provides a computer program product including an instruction. When the computer program product is run on a terminal, the terminal is enabled to perform the method according to any one of the first aspect or the possible designs of the first aspect. Alternatively, when the computer program product is run on a server, the server is enabled to perform the method according to any one of the second aspect or the possible designs of the second aspect.

BRIEF DESCRIPTION OF DRAWINGS

FIG. 3 is a schematic diagram of a characteristic data library according to an embodiment of this application;

DESCRIPTION OF EMBODIMENTS

The following describes the technical solutions in the embodiments of this application with reference to the accompanying drawings in the embodiments of this application.

In the following, some terms of the embodiments of this application are described, so as to help a person skilled in the art have a better understanding.

An application program (application, app for short) in the embodiments of this application is a software program that can implement one or more specific functions. Usually, a plurality of application programs may be installed on a terminal, for example, a camera application, a short message service application, a multimedia messaging service application, various mailbox applications, WeChat, Tencent chat software (QQ), WhatsApp Messenger, Line, a photo sharing application (Instagram), Kakao Talk, or DingTalk. An application program mentioned below may be an application program installed before the terminal is delivered, or may be an application program that a user downloads from a network or obtains from another terminal in a process of using the terminal.

A model, that is, an algorithm, in the embodiments of this application includes one or more functions/equations. The model mentioned in the embodiments of this application may be a model in the prior art, for example, a decision tree, a logistic regression LR algorithm, a naive Bayesian classification algorithm, a random forest algorithm, or a support vector machine algorithm. Usually, the model is a functional formula including a model parameter, an input parameter, and an output parameter. When specific values of the model parameter and the input parameter are provided, an output result can be obtained through calculation by using the functional formula. Model parameters of different models are usually different. The following describes the model parameter by using a neural network unit and the RF algorithm as model examples.

Figure 1:
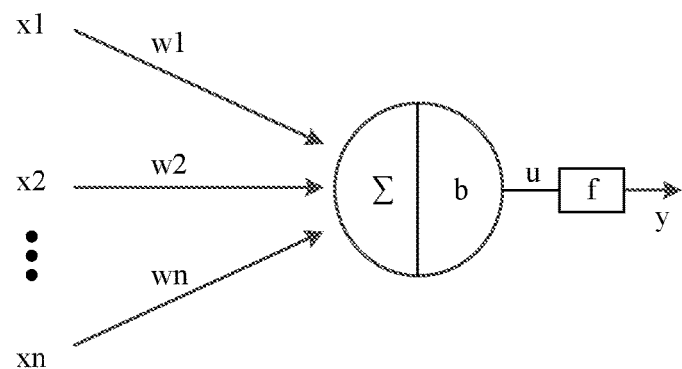
FIG. 1 is a schematic diagram of a model according to an embodiment of this application.

Referring to FIG. 1, an example in which the model is the neural unit is used. The neural unit is a unit with a calculation capability. A calculation manner (that is, the model) of the neural unit is as follows:

$$\begin{cases} u = \sum_{i=1}^{n} w_i x_i + b \\ y = f(u) \end{cases},$$

where
x1 and x2-xn are a plurality of input parameters of the neural unit; w1 and w2-wn are coefficients (also referred to as weights) of the input parameters; b is an offset (used to indicate an intercept between u and an origin of coordinates) of each input parameter; and f is a function used to ensure that a value range of an output result is an interval [0,1] (for example, a Sigmoid function or a tanh function).

Therefore, when the model in a terminal is the neural unit, the model parameters are the weight $w_i$ and the offset b, the input parameter is x, and the output parameter is y. When specific values of w, b, and x are provided, the output result y can be obtained by using the foregoing formula.

Figure 2:
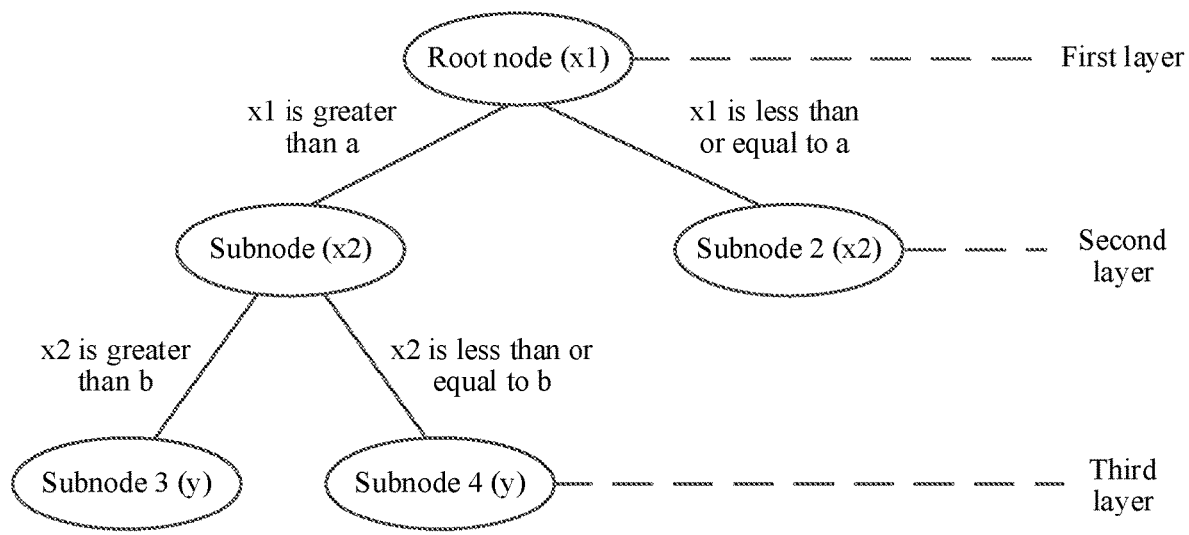
FIG. 2 is a schematic diagram of another model according to an embodiment of this application.

Referring to FIG. 2, an example in which the model is the decision tree is used in FIG. 2.

As shown in FIG. 2, the decision tree includes three layers. The first layer includes a root node, the second layer includes two subnodes, and the third layer includes two subnodes. The root node at the first layer corresponds to an input parameter x1. The decision tree determines whether the input parameter x1 meets a condition (for example, whether the input parameter x1 is greater than a preset value a). When x1 is greater than a, a procedure goes to a subnode 1, or when x1 is less than or equal to a, a procedure goes to a subnode 2. The subnode at the second layer corresponds to an input parameter x2. The decision tree determines whether the input parameter x2 meets a condition (for example, whether the input parameter x2 is greater than a preset value b). When x2 is greater than b, the procedure goes to a subnode 3. A value y of the subnode 3 is an output result. When x2 is less than or equal to b, the procedure goes to a subnode 4. A value y of the subnode 4 is an output result.

Therefore, when the model in a terminal is the decision tree, the model parameter includes a quantity of subnodes, a quantity of layers of the decision tree, a preset value, and the like. The input parameter includes x1 and x2. When specific values of the model parameter and the input parameter are provided, the terminal can obtain the output result y by using the decision tree shown in FIG. 2.

The foregoing describes, only by listing two models as examples, the model parameter, the input parameter, and the output parameter that are of the model. In actual application, another model may be alternatively used. Model parameters of different models are different, and details are not described herein.

It should be noted that a model parameter of a model is usually unknown. The neural unit shown in FIG. 1 is used as an example. If the model parameters (the weight w and the offset b) of the model are unknown, the terminal cannot obtain an output result after running the model. Therefore, in the embodiments of this application, the terminal may determine the model parameter in a model training manner. The model training process is a process in which the terminal determines the model parameter when specific values of the input parameter and the output parameter are known. When the model shown in FIG. 1 is used as an example, the model training process is a process of determining the weight w and the offset b. Specifically, the terminal detects values of the input parameter and the output parameter (xi and yi), substitutes the values into the formula, to obtain the weight w and the offset b. When the model shown in FIG. 2 is used as an example, a process in which the terminal trains the model is a process of determining the model parameters (the quantity of layers, the quantity of subnodes, and the preset value a) of the model. A model can be used only after being trained. That is, the terminal runs the model (the trained model) by using detected characteristic data as an input parameter of the model, to obtain an output result.

Characteristic data in the embodiments of this application is an input parameter of a model. Usually, the characteristic data includes behavior data generated when a user operates a terminal. The terminal uses the behavior data as an input parameter of a model, and predicts a next possible behavior of the user, to provide a corresponding AI service (described later). It should be noted that a model selection method provided in the embodiments of this application is applicable to a plurality of scenarios, and characteristic data may be different in different scenarios. For example, if the model selection method is applied to a scenario of predicting an app to be tapped by a user, the characteristic data may be a record of apps tapped by the user (for example, an app currently tapped, an app tapped last time, and an app tapped penultimate time). The app currently tapped is an app that a user taps at a current moment, the app tapped last time is an app tapped last time before the current moment, and the app tapped penultimate time is an app tapped penultimate time before the current moment.

It should be noted that the terminal may record a time of each piece of data when storing the characteristic data. For example, a current moment t1 is 10:00, and the terminal detects that before the current moment t1, WeChat (app tapped last time) was tapped at t2 (09:58), Alipay was tapped at t3 (09:55), and Meituan was tapped at t4 (09:50). A record of apps tapped between t1 and t2, between t2 and t3, and between t3 and t4 is as follows: The app currently tapped is WeChat, the app tapped last time is Alipay, and the app tapped penultimate time is Meituan.

The terminal runs the model by using the characteristic data (the record of the apps tapped by the user) as the input parameter of the model, to obtain an output result. The output result is an app that the user may tap next time.

FIG. 3 is a schematic diagram of characteristic data according to an embodiment of this application. As shown in FIG. 3, the characteristic data includes a record of apps tapped by a user. It should be noted that for ease of calculation, a terminal may use a number to represent an application, for example, using 1 to represent Taobao, using 2 to represent Tmall, using 3 to represent WeChat, using 4 to represent JD, using 5 to represent Meituan, and using 6 to represent Alipay. In a calculation process, different numbers corresponding to different applications are used for calculation.

Raw data in the embodiments of this application is unprocessed data collected by a terminal. After the terminal preprocesses the raw data (a preprocessing process is described later), the characteristic data is obtained.

Training data in the embodiments of this application is data used for training a model. It can be learned from the foregoing content that model training requires that values of an input parameter and an output parameter are known, to determine an unknown value of a model parameter. Therefore, the training data includes known values of the input parameter and the output parameter. The scenario of predicting an app to be tapped by a user tap is still used as an example. Referring to FIG. 3, sample parameters 2 to 4 may be used as training data. The sample parameter 2 is used as an example. In the sample parameter 2, an app tapped last time is used as a known output parameter, and an app tapped penultimate time and an app tapped third-to-last time are used as known input parameters. Certainly, the training data may be alternatively set by a designer based on experience. This is not limited in the embodiments of this application.

Test data in the embodiments of this application is data used for evaluating a model. The test data includes known values of an input parameter and an output parameter. After determining a model parameter of a model, the terminal may evaluate the model by using test data. For example, a process of evaluating the model may be as follows: The terminal substitutes a known value of an input parameter in the test data into the model, runs the model to obtain a test result, and compares the test result with an actual result. If the test result is consistent with the actual result, the model is evaluated as better. If the test result is inconsistent with the actual result, the model is evaluated as poorer. In addition, the test may be performed for a plurality of times, and the model is evaluated based on a plurality of comparisons between a test result and an actual result. Certainly, the test data may be alternatively set by a designer based on experience. This is not limited in the embodiments of this application.

The scenario of predicting an app to be tapped by a user tap is still used as an example. Referring to FIG. 3, a sample parameter 1 may be used as test data. In the sample parameter 1, an app currently tapped may be used as an actual result, and an app tapped last time and an app tapped penultimate time may be used as known input parameters. The terminal runs the model based on the two input parameters, to obtain a test result. It is assumed that the test result indicates that the app tapped last time is an app 1 but the app tapped last time recorded in the test data (the sample parameter 1) is an app 2, and the app 1 and the app 2 are inconsistent. In this case, the model is evaluated as poorer.

It should be noted that in the embodiments of this application, both the training data required in the model training process and the test data required in the model evaluation process are from a characteristic data library. FIG. 3 is used as an example. Which data is used as the training data and which data is used as the test data are not limited in the embodiments of this application. In the foregoing examples, the sample parameters 2 to 4 in FIG. 3 are used as the training data, and the sample parameter 1 in FIG. 3 is used as the test data. In actual application, another sample parameter may be alternatively used as the training data or the test data.

It should be noted that the foregoing describes differences between the characteristic data, the training data, and the test data by using only the examples shown in FIG. 3, and in actual application, the characteristic data, the training data, and the test data may be more complex. This is not limited in the embodiments of this application.

An AI service in the embodiments of this application is a specific service provided by a terminal based on an output result that the terminal obtains after the terminal runs a model. Usually, the AI service is related to a service. AI services for different services are also different. For example, for a service of predicting an app to be tapped next time, an AI service related to the service may be preloading the app predicted to be tapped next time, or the like. For another example, for another service of predicting a category of a commodity to be tapped next time, an AI service related to the service may be recommending a commodity of a same category to a user, or the like.

It should be understood that a user of the terminal may subscribe to different services. A mobile phone is used as an example. A specific app, for example, an application store, of the mobile phone may provide a service subscription option. When the user subscribes to a specific service, the mobile phone provides a corresponding AI service. Certainly, the mobile phone may alternatively provide the AI service automatically after being activated, and the user does not need to subscribe to the service.

Characteristic data required by different services, that is, input parameters, is also different. That is, for different services, the terminal collects different user behavior data. For example, for the service of predicting an app to be tapped next time, the terminal focuses more on a behavior that a user taps an app. For example, characteristic data required by the service includes an app that the user currently taps, an app that the user taps last time, and an app that the user taps penultimate time. For the service of predicting a category of a commodity to be tapped next time, the terminal focuses more on a behavior that a user taps a commodity. For example, characteristic data required by the service includes a category of a commodity that the user currently taps, a category of a commodity that the user taps last time, and a category of a commodity that the user taps penultimate time. After the user subscribes to a specific service, the terminal collects characteristic data required by the service.

"A plurality of" in the embodiments of this application means two or more than two.

It should be noted that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects, if without special explanation. In addition, in a description in the embodiments of this application, words such as "first" and "second" are merely used for a purpose of distinguishing between descriptions, and should neither be understood as indicating or implying relative importance nor be understood as indicating or implying an order.

The following describes a terminal, a graphical user interface (graphical user interface, GUI) for the terminal, and an embodiment for using the terminal. In some embodiments of this application, the terminal may be a portable terminal, for example, a mobile phone, a tablet computer, or a wearable device with a wireless communication function (for example, a smartwatch). The portable terminal includes a component capable of running a model for calculation (for example, a processor), and a component capable of obtaining characteristic data (for example, a sensor). An example embodiment of the portable terminal includes but is not limited to a portable terminal equipped with iOS®, Android®, Microsoft®, or another operating system. Alternatively, the portable terminal may be another portable terminal, provided that the terminal can obtain characteristic data and run a model for calculation. It should be further understood that in some other embodiments of this application, the terminal may alternatively not be a portable terminal, but may be a desktop computer that can obtain characteristic data and run a model for calculation.

Certainly, in some other embodiments of this application, the terminal may alternatively not need to have a capability of running a model for calculation, but only needs to have a communication capability. The terminal may send detected characteristic data to another device with the capability of running a model for calculation (for example, a cloud server), and the another device performs a calculation to obtain an output result. The terminal only needs to receive the output result sent by the cloud server. In the following, an example is used in which the terminal obtains characteristic data and runs a model for calculation.

Figure 4:
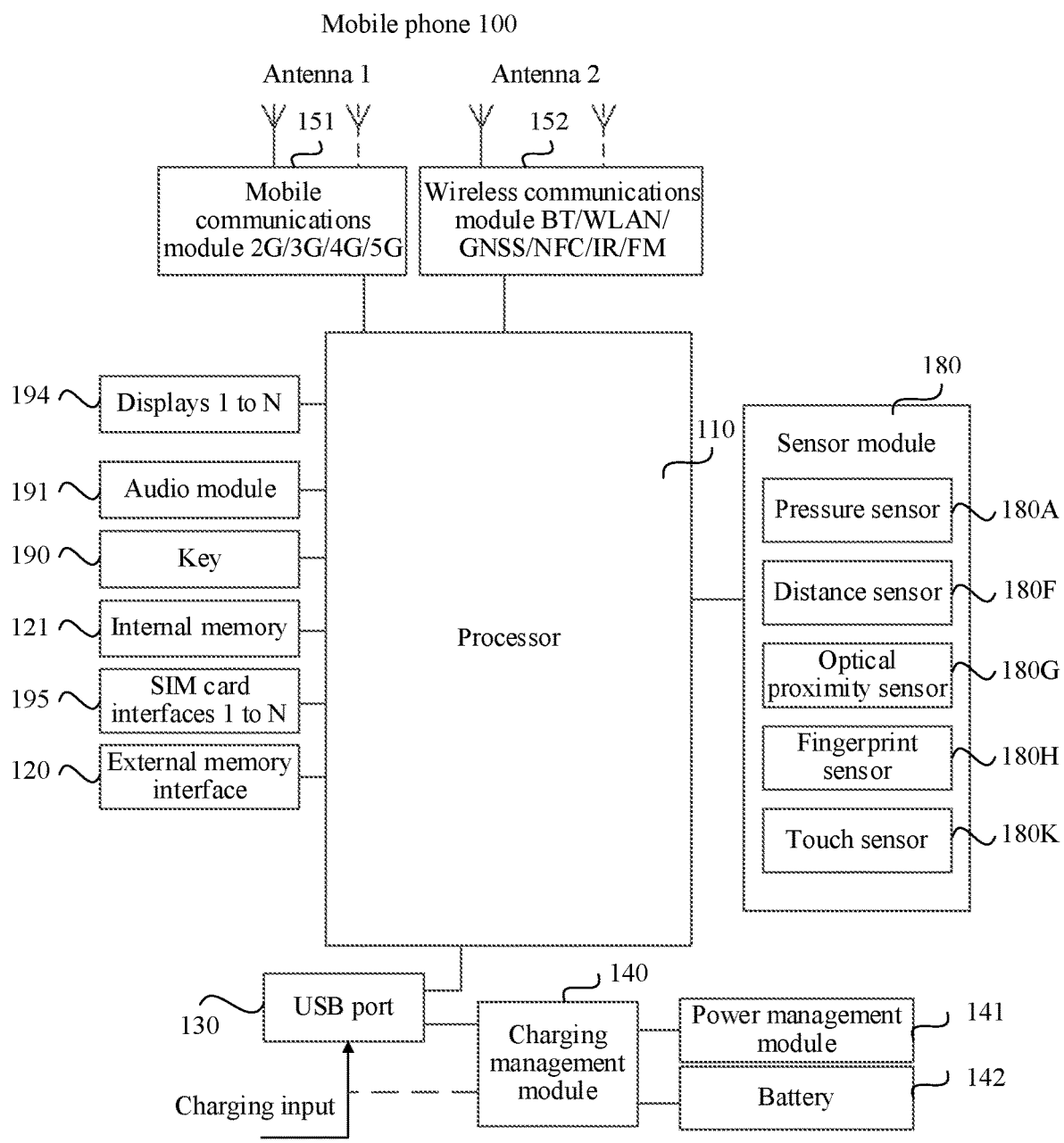
FIG. 4 is a schematic structural diagram of a mobile phone 100 according to an embodiment of this application.

For example, the terminal is a mobile phone. FIG. 4 is a schematic structural diagram of a mobile phone 100.

The mobile phone 100 may include a processor 110, an external memory interface 120, an internal memory 121, a universal serial bus (USB) port 130, a charging management module 140, a power management module 141, a battery 142, an antenna 1, an antenna 2, a mobile communications module 151, a wireless communications module 152, an audio module 191 (including a loudspeaker, a receiver, a microphone, a headset jack, and the like, which are not shown in the figure), a sensor module 180, a key 190, a display 194, a subscriber identity module (SIM) card interface 195, and the like. The sensor module 180 may include a pressure sensor 180A, a distance sensor 180F, a proximity light sensor 180G, a fingerprint sensor 180H, a touch sensor 180K, and the like (the mobile phone 100 may further include another sensor, for example, a temperature sensor, an ambient light sensor, or a gyroscope sensor, which is not shown in the figure).

It may be understood that a structure illustrated in this embodiment of this application does not constitute a specific limitation on the mobile phone 100. In some other embodiments of this application, the mobile phone 100 may include components more or fewer than those shown in the figure, or some components are combined, or some components are split, or the components are disposed differently. The components shown in the figure may be implemented in hardware, software, or a combination of software and hardware.

The following describes the components of the mobile phone 100 shown in FIG. 4.

The processor 110 may include one or more processing units. For example, the processor 110 may include an application processor (AP), a modem processor, a graphics processor (graphics processing unit, GPU), an image signal processor (ISP), a controller, a memory, a video codec, a digital signal processor (DSP), a baseband processor, and/or a neural network processor (neural network processing unit, NPU). Different processing units may be independent components, or may be integrated in one or more processors. The controller may be a nerve center and a command center of the mobile phone 100. The controller may generate an operation control signal according to an instruction operation code and a timing signal, to complete control of instruction fetching and execution.

A memory may be further disposed in the processor 110, and is configured to store an instruction and data. In some embodiments, the memory in the processor 110 is a cache. The cache may store an instruction or data just used or cyclically used by the processor 110. If the processor 110 needs to use the instruction or data again, the processor 110 may directly invoke the instruction or data from the cache. This avoids repeated access and reduces a waiting time of the processor 110, thereby improving efficiency of a system.

The processor 110 can run a model for calculation. For example, the NPU is integrated in the processor 110, and the NPU can run a model for calculation. The embodiments of this application relate to at least two different models. Different models may be run by a same processor, or may be run by different processors. For example, a model with a more complex computation process may be run by a processor with a stronger computing capability, and a model with a simpler computation process may be run by a processor with a weaker computing capability. An example in which the NPU and the application processor are integrated in the processor 110 is used. When a model is an RF algorithm, the model may be run by the NPU, and when a model is an LR algorithm, the model may be run by the application processor. All the foregoing content is an example. In actual application, a person skilled in the art may determine, based on an actual requirement, which model or which models are run by which processor. This is not limited in the embodiments of this application.

The internal memory 121 may be configured to store computer executable program code, where the executable program code includes an instruction. By running the instruction stored in the internal memory 121, the processor 110 executes various functional applications of the mobile phone 100 and performs data processing of the mobile phone 100. The internal memory 121 may include a program storage area and a data storage area. The program storage area may store an operating system, an application program required by at least one function (for example, a sound play function or an image play function), and the like. The data storage area may store data (for example, audio data or a phone book) and the like that are created during use of the mobile phone 100.

The internal memory 121 may be further configured to store at least two models (for example, the program storage area may store at least two models). The models stored in the internal memory 121 may be accessed and run by the processor 110. As shown in FIG. 4, the internal memory 121 may further store code of a behavior log collector, code of a characteristic data preprocessor, code of an adaptive selector, code of an evaluator, and code of an executor. When the code is run by the processor 110, a related function is implemented. Details are described later.

The internal memory 121 may include a high-speed random access memory, and may further include a nonvolatile memory, for example, at least one magnetic disk storage device, a flash memory device, or a universal flash storage (universal flash storage, UFS).

The following describes functions of the sensor module 180.

The pressure sensor 180A is configured to sense a pressure signal, and may convert the pressure signal into an electrical signal. In some embodiments, the pressure sensor 180A may be disposed on the display 194.

The distance sensor 180F is configured to measure a distance. The mobile phone 100 may measure a distance by using infrared light or a laser. In some embodiments, in a shooting scenario, the mobile phone 100 may measure a distance by using the distance sensor 180F, to implement fast focusing. In some other embodiments, the mobile phone 100 may further detect, by using the distance sensor 180F, whether a person or an object is approaching.

The proximity light sensor 180G may include, for example, a light-emitting diode (LED) and an optical detector, for example, a photodiode. The light-emitting diode may be an infrared light-emitting diode. The mobile phone 100 emits infrared light to the outside by using the light-emitting diode. The mobile phone 100 detects infrared reflected light from a nearby object by using the photodiode. When detecting sufficient reflected light, the mobile phone 100 can determine that there is an object near the mobile phone 100. When detecting insufficient reflected light, the mobile phone 100 can determine that there is no object near the mobile phone 100. The mobile phone 100 may detect, by using the proximity light sensor 180G, that a user holds the mobile phone 100 close to an ear for a call, to automatically turn off a screen to save power. The proximity light sensor 180G may be alternatively used in a smart cover mode or a pocket mode, to implement automatic screen unlocking and locking.

The fingerprint sensor 180H is configured to collect a fingerprint. The mobile phone 100 may implement fingerprint-based unlocking, accessing an application lock, fingerprint-based photographing, fingerprint-based incoming call answering, and the like by using a characteristic of a collected fingerprint.

The touch sensor 180K is also referred to as a "touch panel". The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor 180K. The touch sensor 180K may transfer the detected touch operation to an application processor, to determine a type of a touch event. Visual output related to the touch operation may be provided by using the display 194.

In some other embodiments, the touch 180K may be alternatively disposed on a surface of the mobile phone 100, and is located in a position different from that in which the display 194 is located.

The following describes functions implemented when the processor 110 runs the code of the behavior log collector, the code of the characteristic data preprocessor, the code of the adaptive selector, the code of the evaluator, and the code of the executor.

The behavior log collector collects raw data. The raw data may reflect the user's behavior habit of operating the mobile phone 100.

For example, when detecting a touch operation, the touch sensor 180K sends the touch operation to the processor 110. The processor 110 determines coordinates of a position corresponding to the touch operation (for example, when the touchscreen is a capacitive touchscreen, the processor 110 determines, based on a change in capacitance, the coordinates of the position corresponding to the touch operation), that is, the coordinates of the position that is on the display and that is tapped by the user. An icon corresponding to the coordinates of the position is an icon tapped by the user (alternatively, the touch sensor 180K can determine coordinates of a position corresponding to the touch operation, and send the touch operation and the coordinates of the position to the processor 110, and in this case, the processor 110 does not need to determine the coordinates of the position corresponding to the touch operation again). The processor 110 runs the code of the behavior log collector and records information about the icon (an application package name and a tap time), to obtain the raw data. Certainly, if the touch sensor 180K can determine the icon tapped by the user, the touch sensor 180K may send the information about the icon to the processor 110.

The processor 110 runs the code of the behavior log collector and may further record duration of using each application. For example, if an application interface of an application is displayed for three minutes, duration of using the application is three minutes.

The data preprocessor is configured to preprocess the raw data collected by the behavior log collector. For example, the touch sensor 180K detects two touch operations within a comparatively short time interval. The touch sensor 180K sends the touch operation to the processor 110, and the processor 110 determines coordinates of positions corresponding to the two touch operations. It is assumed that there is no corresponding icon at coordinates of a position corresponding to the first touch operation (may be a misoperation), and there is a corresponding icon at coordinates of a position corresponding to the second touch operation.

Therefore, the behavior log collector collects two records of tapping apps. A record of tapping an app for the first time is empty, and the other record of tapping an app for the second time is not empty. The data preprocessor may delete the record of tapping the app for the first time, or the data preprocessor may fill the record of tapping the app for the first time with content, for example, fill the record of tapping the app for the first time with the app tapped for the second time.

The adaptive selector is configured to select one from a plurality of models. If models are stored in the internal memory 121, the adaptive selector may select one from the plurality of models stored in the internal memory 121. If models are stored in an external memory, the adaptive selector may select one from the plurality of models stored in the external memory (for example, select a model from the external memory through the external memory interface 120). There are a plurality of manners in which the adaptive selector selects one from a plurality of models, and details are described later.

The evaluator is configured to evaluate the model selected by the adaptive selector. There are a plurality of manners in which the evaluator evaluates a model. For example, the evaluator may run the model by using test data (refer to the foregoing description of the test data), to obtain a test result, and compare the test result with an actual result. If the test result is consistent with the actual result, the model is evaluated as better. If the test result is inconsistent with the actual result, the model is evaluated as poorer. A process in which the evaluator evaluates a model is described later.

The executor is configured to run the model selected by the adaptive selector, for calculation. Specifically, the executor runs the model by using characteristic data collected by the behavior log collector as an input parameter of the model, to obtain an output result.

In the foregoing, an example is used in which the behavior log collector, the data preprocessor, the adaptive selector, the evaluator, and the executor are software code. Different software code may all run on a same processor, or may run on different processors (for example, when the application processor and the NPU are integrated in the processor 110, the code of the adaptive selector runs on the application processor, and the code of the executor runs on the NPU).

In the foregoing, an example is used in which the behavior log collector, the data preprocessor, the adaptive selector, the evaluator, and the executor are software code. Actually, one or more of the behavior log collector, the data preprocessor, the adaptive selector, the evaluator, and the executor may alternatively be hardware (or a combination of software and hardware). The hardware may be disposed in the mobile phone 100 (for example, in a form of a chip or other hardware) before the mobile phone 100 is delivered.

For example, the executor is hardware. The executor may be integrated in the processor 110, that is, as a part of the processor 110 (for example, when the processor 110 is an NPU, the executor is a part of the NPU), or may be a component independent of the processor 110. If the executor is a component independent of the processor 110, the processor 110 may not have a capability of running a model for calculation, and the executor performs calculation.

The mobile phone 100 implements a display function by using the GPU, the display 194, the application processor, and the like. The GPU is an image processing microprocessor, and connects to the display 194 and the application processor. The GPU is configured to perform mathematical and geometric calculation for graphics rendering. The processor 110 may include one or more GPUs, which execute a program instruction to generate or change display information.

The display 194 is configured to display an image, a video, and the like. The display 194 includes a display panel. The display panel may use a liquid crystal display (LCD), an organic light-emitting diode (OLED), an active-matrix organic light-emitting diode or an active-matrix organic light-emitting diode (AMOLED), a flexible light-emitting diode (FLED), a mini-LED, a micro-LED, a micro-OLED, a quantum dot light-emitting diode (QLED), and the like. In some embodiments, the mobile phone 100 may include one or N displays 194, where N is a positive integer greater than 1.

In addition, the mobile phone 100 may implement an audio function, for example, music playing or recording, by using the audio module 191 (the loudspeaker, the receiver, the microphone, and the headset jack), the processor 110, and the like. The mobile phone 100 may receive input from the key 190, and generate key signal input related to user setting and function control of the mobile phone 100. The SIM card interface 195 in the mobile phone 100 is configured to connect to a SIM card. The SIM card may be inserted into the SIM card interface 195 or removed from the SIM card interface 195 to achieve contact with the mobile phone 100 or separation from the mobile phone 100, respectively.

Although not shown in FIG. 1, the mobile phone 100 may further include a camera, for example, a front-facing camera or a rear-facing camera; may further include a motor, configured to generate a vibration prompt (for example, a vibration prompt for an incoming call); and may further include an indicator, for example, an indicator LED, which is configured to indicate a charging status or a power change, or may be configured to indicate a message, a missed call, a notification, or the like.

In the model selection method provided in the embodiments of this application, the mobile phone 100 may select one from a plurality of models, and then run the model for calculation by using detected characteristic data as an input parameter of the model, to obtain an output result. The model selection method provided in the embodiments of this application is applicable to a plurality of application scenarios. In different application scenarios, characteristic data is different. For example, in an application scenario in which the mobile phone 100 predicts an app to be tapped by a user, characteristic data may be a record of apps tapped by the user (for example, an app currently tapped by the user, an app tapped by the user last time, and an app tapped by the user penultimate time), and the like. After selecting one from a plurality of models, the mobile phone 100 uses the characteristic data as an input parameter of the selected model, to obtain an output result. The output result indicates an app that the user may tap next time.

For example, the mobile phone 100 detects that the app currently tapped by the user is Taobao, the app tapped by the user last time is Tmall, and the app tapped by the user penultimate time is WeChat. The mobile phone 100 runs the model by using these parameters as the input parameters of the model, to obtain an output result. It is assumed that the input result is JD, that is, the mobile phone 100 predicts that the user may tap JD next time. After predicting that the user may tap JD next time, the mobile phone 100 may make some preparations, for example, preloading JD or shutting down an app that is running in the background and that the user may not tap temporarily, to clear memory space.

Usually, different users have different habits when operating a same mobile phone. According to the model selection method provided in the embodiments of this application, when a user operates a mobile phone, the mobile phone 100 may predict a next possible behavior of the user based on the user's behavior habit of operating the mobile phone. Usually, a same user also has different habits of operating a mobile phone within different time periods. According to the model selection method provided in the embodiments of this application, the mobile phone 100 may predict a next possible behavior of the user in real time based on the user's behavior habit of operating a mobile phone within a current time period.

The foregoing application scenario is merely an example. The model selection method provided in the embodiments of this application may further be applicable to another application scenario (described later). The following describes, by using the foregoing application scenario as an example, the model selection method provided in the embodiments of this application.

Figure 5:
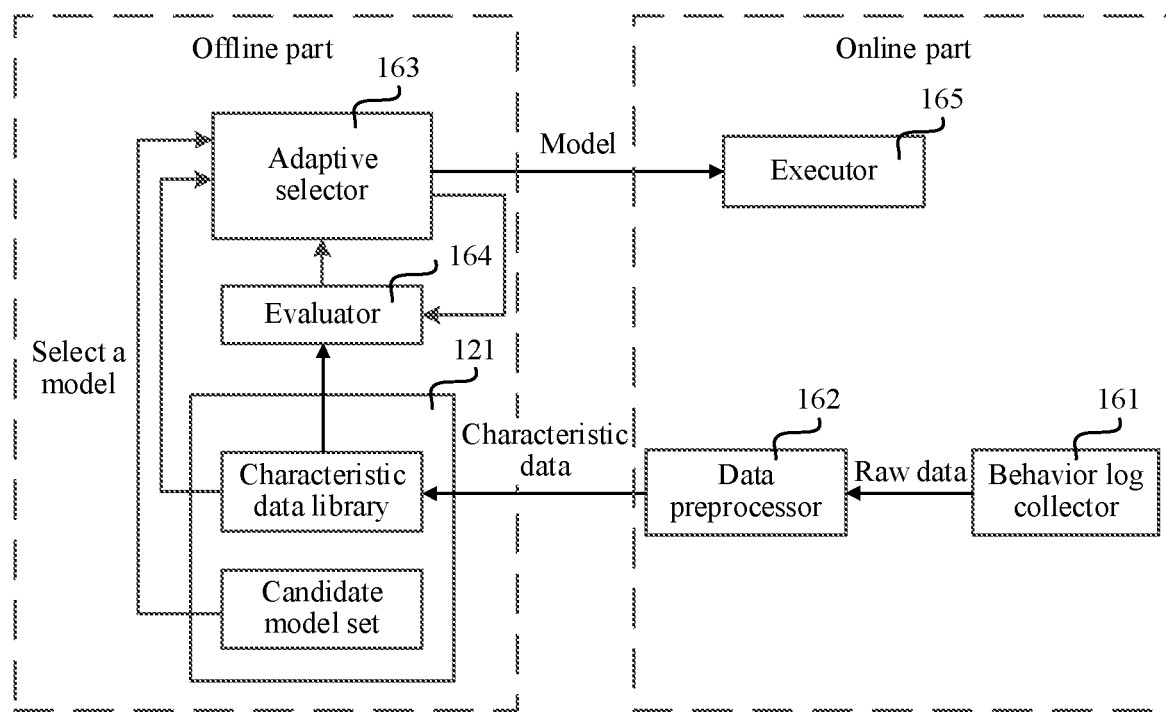
FIG. 5 is a schematic structural diagram of some components of a mobile phone 100 according to an embodiment of this application.

For ease of describing the model selection method provided in the embodiments of this application, the following describes, by using components related to the model selection method provided in the embodiments of this application, the model selection method provided in the embodiments of this application. For details, refer to FIG. 5. For components in FIG. 5, refer to related descriptions about FIG. 1. As shown in FIG. 5, the mobile phone 100 is divided into an online part and an offline part. The offline part includes the adaptive selector and the evaluator. Therefore, a function of the offline part includes a process in which the adaptive selector selects a model and trains a model (determining a model parameter) and a process in which the evaluator evaluates a model. It can be learned from the foregoing content that data with a known input parameter and a known output result is used during model training or model evaluation, the data is used only for selecting a model and evaluating a model, and an AI service does not need to be provided (real-time characteristic data may not be used as an input parameter, and historical or preset data is used instead, provided that the data is the data with a known input parameter and a known output result).

A function of the online part includes that the executor runs the model selected by the offline part to obtain an output result, and provides an AI service based on the output result. Therefore, the model used by the online part is a most suitable model selected by the offline part, and the online part is a part that provides an AI service for a user. Usually, to provide an accurate AI service for the user, the online part uses characteristic data collected in real time as an input parameter of the model.

The offline part and the online part may or may not run simultaneously. For example, when the executor in the online part is using a model for calculation, the offline part may perform procedures such as model selection, model training, and model evaluation. It is assumed that the offline part selects another model and sends the another model to the executor in the online part, and the executor performs calculation by using the another model. For another example, the offline part may keep running, whereas the online part runs only when needed, for example, runs when there is characteristic data and does not run when there is no characteristic data (the user does not operate the mobile phone for a long time). For another example, the offline part may stop working for a period of time after selecting a model, whereas within the period of time, the online part still needs to perform calculation by using the selected model, to provide an AI service in real time.

As shown in FIG. 5, the internal memory 121 in the mobile phone 100 stores a candidate model set and a characteristic data library (in actual application, a model database and the characteristic data library may be stored in another memory). The following describes functions of the candidate model set and the characteristic data library.

(1) The candidate model set includes at least two models.

It can be learned from the foregoing content that a model is an algorithm, that is, the model database stores at least two algorithms. The at least two algorithms herein may be stored on the mobile phone 100 before a terminal is delivered, or may be algorithms pushed by a cloud server to the mobile phone 100. For example, a cloud server of a Huawei mobile phone may periodically push an algorithm to the Huawei mobile phone, and the Huawei mobile phone stores the pushed algorithm in the candidate model set. The model (that is, the algorithm) may be an algorithm in the prior art, for example, an LR algorithm, an NB algorithm, or an RF algorithm.

Optionally, to distinguish between different models, the mobile phone 100 may set a model identifier for each model, for example, a model 1 for a decision tree, a model 2 for the NB algorithm, a model 3 for the RF algorithm, and a model 4 for an SVM algorithm.

(2) The characteristic data library includes characteristic data, where the characteristic data may be used as an input parameter of a model. The characteristic data has been described above, and details are not described herein again.

The following describes the model selection method that is provided in the embodiments of this application and that is implemented by the mobile phone 100 shown in FIG. 5.

A behavior log collector collects raw data, and a data preprocessor preprocesses the raw data, to obtain characteristic data (a specific process is mentioned in the foregoing content, and details are not described herein again). The data preprocessor stores the characteristic data in the characteristic data library. An adaptive selector selects a model (a model parameter is unknown) from a model database, then selects training data from the characteristic data library, and trains the selected model by using the training data, to obtain a trained model (for ease of description, the trained model is referred to as a model A for short hereinafter, and the model parameter in the model A is known). An evaluator selects test data from the characteristic data library and evaluates the model A by using the test data (a specific process is described later). If an evaluation result is "poorer", the adaptive selector selects another model from a plurality of models and then performs the foregoing process for the another model. If an evaluation result is "better", an executor uses the model A for calculation (selects a characteristic parameter from the characteristic data library, and runs the model A by using the characteristic parameter as an input parameter of the model A, to obtain an output result).

Figures 6, 7:
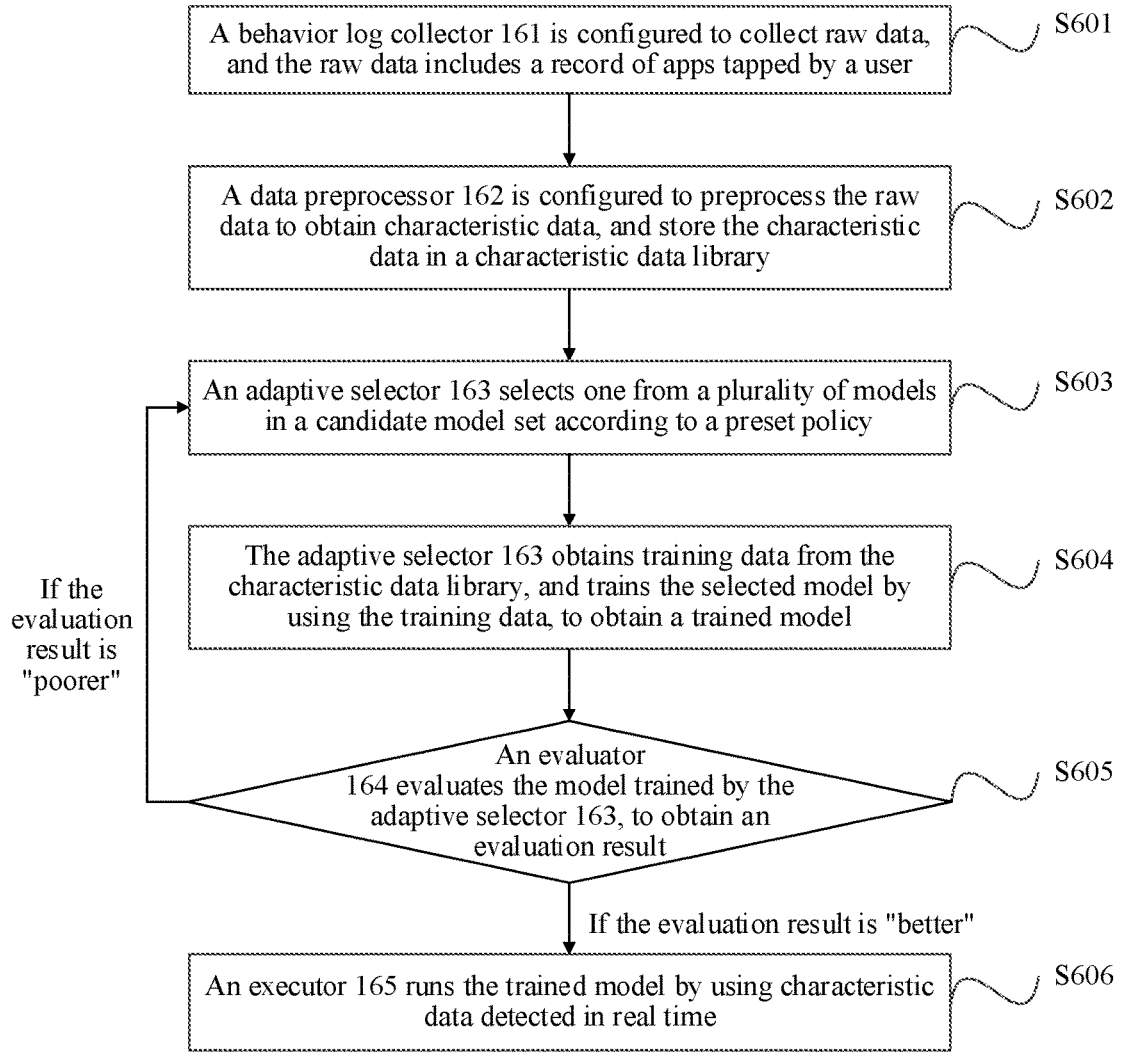
FIG. 6 is a schematic flowchart of a model selection method according to an embodiment of this application.
FIG. 7 is a schematic diagram of a sample parameter according to an embodiment of this application.

Specifically, FIG. 6 is a schematic flowchart of a model selection method according to an embodiment of this application. The procedure includes that the processor 110 runs code of a behavior log collector, code of a characteristic data preprocessor, code of an adaptive selector, code of an evaluator, and code of an executor to perform the following process, where the code is stored in the internal memory 121.

S601: The behavior log collector is configured to collect raw data, where the raw data includes characteristic data, and the characteristic data includes a record of apps tapped by a user.

S602: The data preprocessor is configured to preprocess the raw data to obtain characteristic data, and store the characteristic data in a characteristic data library.

It should be noted that it may be that the behavior log collector detects one piece of raw data (for example, an app currently tapped), and then sends the piece of raw data to the data preprocessor, or may be that the behavior log collector detects at least two pieces of raw data (for example, an app currently tapped and an app tapped last time), and then sends the at least two pieces of raw data together to the data preprocessor.

A process in which the data preprocessor may preprocess the raw data collected by the behavior log collector is described above, and details are not described herein again for brevity of the specification.

S603: The adaptive selector selects one from a plurality of models in a candidate model set according to a preset policy.

Policy 1: The adaptive selector may randomly select one from the plurality of models.

For example, the candidate model set includes a decision tree and three algorithms of an LR algorithm, an NB algorithm, and an RF algorithm. The adaptive selector may perform random selection, for example, select the LR algorithm. When not sure which model is more suitable (when the mobile phone 100 is activated or powered on), the mobile phone 100 may use the policy 1.

Policy 2: The adaptive selector selects one from the plurality of models based on a reinforcement learning algorithm. For example, a terminal selects a model, then evaluates the model to obtain an evaluation result, and selects a model based on the evaluation result in a manner such as selecting a model with a best evaluation result from the models or selecting a model whose evaluation result meets a preset condition (described later). A process in which the terminal evaluates a model is described later. The adaptive selector may periodically select a model (for example, may automatically perform model selection after a model is used for a period of time), or perform model selection when a selected model does not meet a condition after being used for a period of time. For example, within a last time period, a model selected by the mobile phone 100 is a model 1, and within a next time period, the user's behavior habit changes. Therefore, accuracy of an output result of the model 1 selected within the last time period is poorer (the output result is not consistent with an app that the user actually taps). In this case, the mobile phone 100 may perform model selection. In short, the adaptive selector may continually select a model suitable for a current actual status.

The following uses an example in which the reinforcement learning algorithm is a Q-table algorithm. A Q-table includes a Q value of each model, and the Q value is a parameter related to a result of evaluating each model. For example, if a model has a better evaluation result, the model has a larger Q value, or if a model has a poorer evaluation result, the model has a smaller Q value. Therefore, a Q value may reflect a result of evaluating a model. The adaptive selector may select a model with the largest Q value in the Q-table.

Optionally, the Q value of each model in the Q-table may be set before the mobile phone 100 is delivered. For example, before the mobile phone 100 is delivered, a designer determines the Q value of each model based on an empirical value. Certainly, the Q value of each model in the Q-table may be alternatively recorded during use of the mobile phone 100. For example, when the mobile phone 100 is activated or powered on, the Q value of each model in the Q-table is 0. After evaluating a model, the evaluator records a Q value of the model in the Q-table.

Therefore, when a Q value of a model in the Q-table is not 0, the adaptive selector may take the Q value of the model in the Q-table into consideration when selecting a model. For example, if the Q value of the model is comparatively large, the adaptive selector may select the model. Alternatively, the adaptive selector may select a model with a larger Q value in the Q-table. Certainly, the adaptive selector may alternatively select a model according to another policy. Details are not described in this embodiment of this application.

It should be noted that the foregoing uses merely the Q-table as an example, and in actual application, another reinforcement learning method or optimum algorithm may be alternatively used. This is not limited in this embodiment of this application.

Policy 3: The mobile phone 100 may select, based on a current service, a model that matches the service.

It can be learned from the foregoing content that different services correspond to different AI services. Therefore, the mobile phone 100 may select different models to run different services. The following two services are used as examples: predicting an app to be tapped by a user next time and predicting a category of a commodity that a user may tap next time. In this case, the mobile phone 100 may select different models, that is, perform the procedure shown in FIG. 6 once for each service.

The policy 1 and the policy 2 may be combined for use. For example, when the mobile phone 100 is activated or powered on, the Q value of each model in the Q-table is 0. In this case, the adaptive selector may select a model according to the policy 1. After filling the Q-table with the Q value of each model in a subsequent process, the adaptive selector may select a model according to the policy 2.

After selecting the model, the adaptive selector may train the model to determine a model parameter.

S604: The adaptive selector obtains training data from the characteristic data library, and trains the selected model by using the training data, to obtain a trained model.

It can be learned from the foregoing content that a process of training a model is a process of determining a model parameter. When training a model, the adaptive selector can determine a model parameter only after obtaining a known input parameter and a known output result. Therefore, the adaptive selector may select the training data from the characteristic data library shown in FIG. 3. The training data includes a known input parameter and a known output result. For example, the adaptive selector may select a sample parameter 2 as the training data. In the sample parameter 2, an app tapped last time may be used as an output parameter, and an app tapped penultimate time and an app tapped third-to-last time may be used as the input parameters.

Usually, to obtain a more accurate model parameter, a plurality of sample parameters may be selected during model training. For example, FIG. 7 is a schematic diagram of four sample parameters. Each sample parameter corresponds to a sample serial number (for ease of description, different from a sample parameter in FIG. 3, each sample parameter in FIG. 7 uses an app tapped penultimate time, an app tapped last time, and an app currently tapped as examples).

Figure 8:
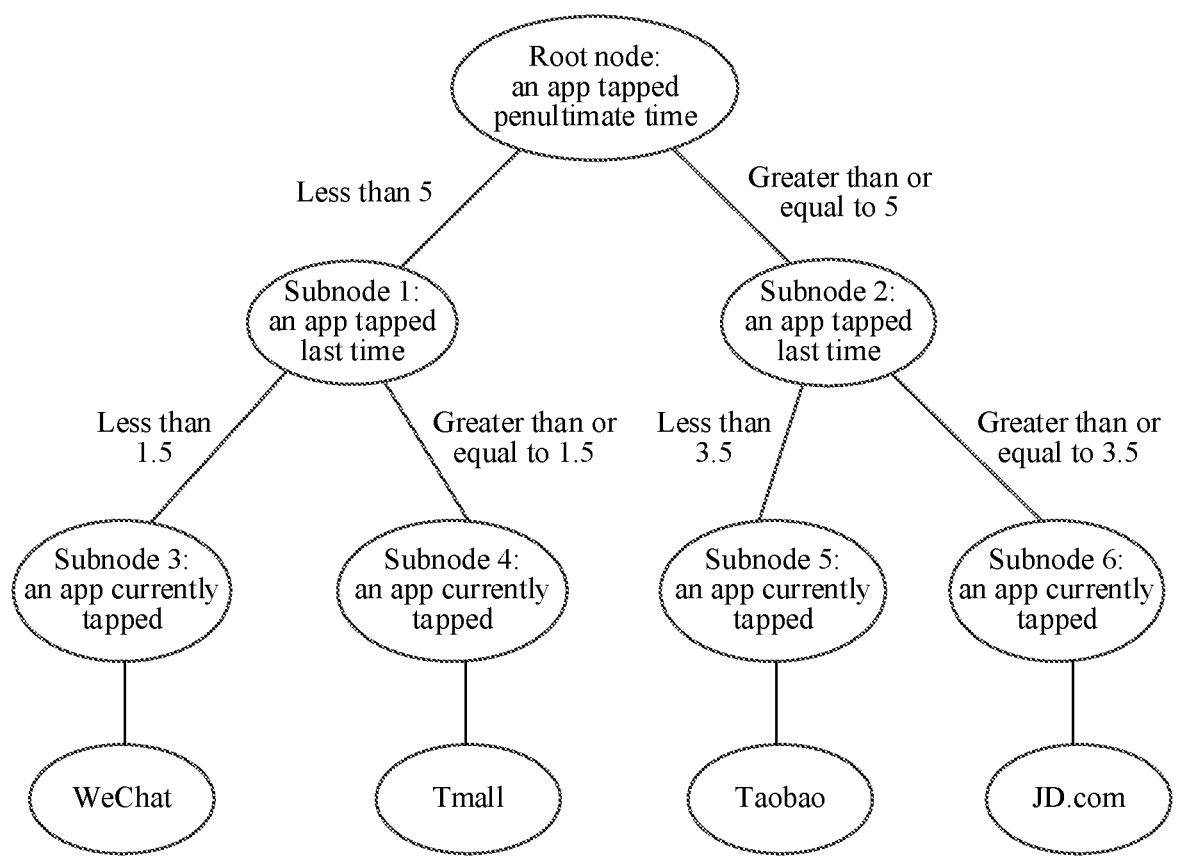
FIG. 8 is a schematic diagram of a model training process according to an embodiment of this application.
Figures 9, 10:
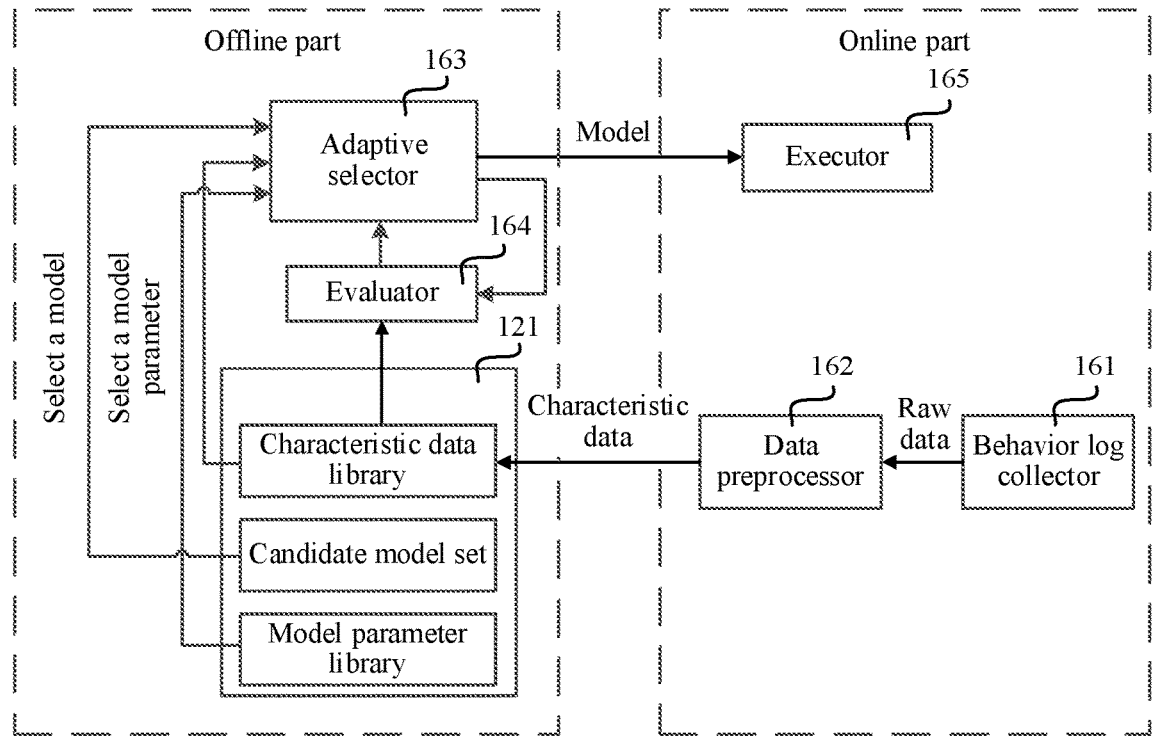
FIG. 9 is a schematic structural diagram of some components of a mobile phone 100 according to an embodiment of this application.
FIG. 10 is a schematic diagram of a correspondence between a model and a model parameter according to an embodiment of this application.

The following describes, by using an example in which the model is the decision tree shown in FIG. 2, a process in which the adaptive selector trains a model. FIG. 9 is a schematic diagram of a model training process according to an embodiment of this application. As shown in FIG. 8, the process is as follows:

Step 1: The adaptive selector uses the apps tapped penultimate time in samples numbered 1 to 4 in FIG. 6 as a root node, determines a maximum value and a minimum value in values of the apps currently tapped in the samples numbered 1 to 4, and determines an intermediate value based on the maximum value and the minimum value.

The intermediate value may be an average value of the maximum value and the minimum value. For example, as shown in FIG. 7, in the samples numbered 1 to 4, the maximum value in the values of the apps tapped penultimate time is 6, and the minimum value in the values of the apps tapped penultimate time is 1. In this case, the intermediate value is 3.5. The intermediate value may alternatively be a middle value in the values of the apps tapped penultimate time in the samples numbered 1 to 4. For example, still as shown in FIG. 7, a middle value of the values of the apps tapped penultimate time in the samples numbered 1 to 4 is 5 or 4. In subsequent steps, an example in which the intermediate value is 5 is used.

Step 2: The adaptive selector groups, to one branch (for example, a subnode 1 in FIG. 8), the samples numbered 1 and 2 whose apps tapped penultimate time have a value less than the intermediate value (that is, 5), and groups, to another branch (for example, a subnode 2 in FIG. 8), the samples numbered 3 and 4 whose apps tapped penultimate time have a value greater than or equal to 5.

Step 3: The adaptive selector uses the app tapped last time as a new root node, determines a maximum value and a minimum value in values of the apps tapped last time in the branch of the subnode 1 (the samples numbered 1 and 2), and determines an intermediate value based on the maximum value and the minimum value.

Similarly, the intermediate value may be an average value of the maximum value and the minimum value. For example, as shown in FIG. 7, in the samples numbered 1 and 2, the maximum value in the values of the apps tapped last time is 2, and the minimum value in the values of the apps tapped last time is 1. In this case, the intermediate value is 1.5. The intermediate value may alternatively be a middle value between the values of the apps tapped last time in the samples numbered 1 and 2. For example, still as shown in FIG. 7, a middle value between the values of the apps tapped last time in the samples numbered 1 and 2 is 1 or 2. In subsequent steps, an example in which the intermediate value is 1.5 is used.

Step 4: For the samples numbered 1 and 2, the adaptive selector groups, to one branch (a subnode 3 shown in FIG. 8), the sample numbered 1 whose app tapped last time has a value greater than 1.5, and groups, to one branch (a subnode 4 shown in FIG. 8), the sample numbered 2 whose apps tapped last time has a value less than or equal to 1.5.

Step 5: Because the subnode 3 includes only the sample numbered 1, there is no need to continue grouping. The subnode 3 represents an app currently tapped. In this case, the subnode 3 corresponds to WeChat.

In step 1 to step 5, an example of a process from the root node to the subnode 3 is described. A process from the root node to the subnode 4 (a subnode 5 or a subnode 6) is similar, and details are not described for brevity of the specification. In addition, the model training process described above uses an example in which the model is the decision tree, and for ease of description, only some sample parameters are provided in FIG. 7. In actual application, the adaptive selector may alternatively train the model by using more sample parameters.

The foregoing describes the process in which the adaptive selector trains the model. In the training process, the adaptive selector determines model parameters of the model, for example, a quantity of layers of the decision tree in FIG. 8, a quantity of subnodes, and intermediate values from the root node to the subnodes. After the adaptive selector trains the model, the evaluator may evaluate the trained model.

S605: The evaluator evaluates the model trained by the adaptive selector, to obtain an evaluation result. If the evaluation result is "better", S606 is performed; or if the evaluation result is "poorer", S603 is performed.

It can be learned from the foregoing content that a process in which the evaluator evaluates a model is as follows: The evaluator runs the model by using a known input parameter in test data to obtain a test result, and compares the test result with an actual result (the test data includes the actual result). If the test result is consistent with the actual result, an evaluation result is "better"; or if the test result is inconsistent with the actual result, an evaluation result is "poorer". As mentioned earlier, the evaluator may evaluate a result of the model based on results of a plurality of comparisons.

The following describes the process in which the evaluator evaluates a model by using test data.

Because the app currently tapped, the app tapped last time, and the app tapped penultimate time are used as examples to describe the model training process in FIG. 7 and FIG. 8, the app currently tapped, the app tapped last time, and the app tapped penultimate time are still used as examples to describe the model evaluation process.

For example, the evaluator may use the app currently tapped as an actual result, and use the app tapped last time and the app tapped penultimate time as input parameters of the model, to evaluate the model. Still as shown in FIG. 8, the specific process is as follows:

The evaluator uses the app tapped penultimate time as a root node, and determines that a value of an app tapped penultimate time is less than 5. In this case, a procedure goes to the subnode 1. Then, the evaluator determines that a value of an app tapped last time is greater than or equal to 1.5. In this case, the procedure goes to the subnode 4, and the evaluator determines that an output result is Tmall (that is, an app currently tapped is Tmall, as is calculated by the model). Assuming that an actual result is that the app currently tapped is JD, the evaluator compares the output result (Tmall) with the actual result, and finds that the output result is inconsistent with the actual result. In this case, the model is evaluated as poorer.

When an evaluation result of the trained model is "poor", the adaptive selector may select a new model and train the model, and then the model is evaluated. The process is similar to the foregoing process, and details are not described. When an evaluation result of the trained model is "better", the adaptive selector may send the model to the executor. The executor runs the model by using detected characteristic data as an input parameter of the model, to obtain an output result.

It should be noted that only one sample parameter is used as an example in the foregoing model evaluation process, and in actual application, the evaluator may use a plurality of sample parameters in a process of evaluating a model. For example, one sample parameter corresponds to one evaluation result, and a plurality of sample parameters correspond to a plurality of evaluation results. If most of the plurality of evaluation results are "better", a final evaluation result of the model is "better". The evaluation result may be indicated in a plurality of forms. For example, "1" indicates that an evaluation result is "good", and "0" indicates that an evaluation result is "poor"; or "good" indicates that an evaluation result is "good", and "bad" indicates that an evaluation result is "poor". In short, an indication form of the evaluation result is not limited in this embodiment of this application.

S606: The evaluator runs the model by using the detected characteristic data as the input parameter of the model, to obtain the output result.

The executor may obtain an app currently tapped, an app tapped last time, and an app tapped penultimate time from the characteristic data library, and run the model for calculation by using the app currently tapped, the app tapped last time, and the app tapped penultimate time as the input parameters of the trained model, to obtain an output result. The output result is an app that the user taps next time.

It should be noted that a process in which the executor runs the model is similar to the foregoing model evaluation process, except that the executor does not need to perform a process of comparing the test result with the actual result in the foregoing evaluation process. Therefore, for brevity of the specification, details are not described.

It should be noted that after evaluating each model, the evaluator may store an evaluation result of the model in a manner that the evaluation result of the model corresponds to the mode; or the Q-table is still used as an example, and the evaluator may determine a Q value of each model based on an evaluation result of each model and a Q value calculation formula Q=f (evaluation result), and store the Q value in a manner that the Q value corresponds to the model, to obtain the foregoing Q-table. Assuming that the model selected in the procedure shown in FIG. 6 is the RF algorithm, a Q value (for example, 0.8) is obtained based on the evaluation result of the model, and the Q value is recorded in the following Q-table.

| | Q-table | | | |
|---|---|---|---|---|
| | Model 1 (decision tree) | Model 2 (NB) | Model 3 (RF) | Model 4 (SVM) |
| Q value | 0 | 0 | 0.8 | 0 |

It should be noted that when the mobile phone 100 is activated or powered on, the Q-table is empty. During use, the mobile phone 100 may train a plurality of models, and then evaluate each model. Every time a model is evaluated, a Q value of the model may be obtained, and the Q value of the model is recorded in the Q table. In this way, in a subsequent model selection process, the adaptive selector may perform selection based on the Q-table, for example, select a model with a larger Q value in the Q-table. It should be understood that the Q-table may change dynamically. That is, every time a model is evaluated, a new Q value may be calculated based on a new evaluation result of the model, and the Q-table may be updated with the new Q value.

It should be understood that the foregoing uses merely the Q-table as an example for description, and in actual application, another algorithm or optimum algorithm may be alternatively used. This is not limited in this embodiment of this application.

It should be noted that in the foregoing embodiment, the mobile phone 100 uses the app currently tapped, the app tapped last time, and the app tapped penultimate time as input parameters of a model, and in actual application, the mobile phone 100 may alternatively use more characteristic data as input parameters to run a model. For example, the mobile phone 100 uses the app currently tapped, the app tapped last time, the app tapped penultimate time, and duration of using a current app as input parameters of a model. In this case, when training the model (or evaluating the model), the mobile phone 100 needs to use more training data (or test data). For another example, the mobile phone 100 may alternatively use a current geographic location, the app currently tapped, the app tapped last time, and the app tapped penultimate time as input parameters of a model, to obtain an output result. The output result indicates an app that the user may tap next time at the current geographic location.

Optionally, after obtaining the output result (the app that the user may tap next time) through the foregoing process, the mobile phone 100 may provide an AI service based on the output result. For example, the mobile phone 100 preloads the application that the user may tap next time; the mobile phone 100 shuts down another application that is running in the background and that is not the application that the user may tap next time; the mobile phone 100 outputs prompt information, where the prompt information is used to prompt the application that the user may tap next time, and when detecting the user's operation of determining the prompt information, the mobile phone 100 preloads the application that the user may tap next time; or the mobile phone 100 may output recommendation information, where the recommendation information is used for recommending, to the user, an app that is not installed on the mobile phone 100 and that is of a same type as the app that the user may tap next time.

In this embodiment of this application, in a process of providing an AI service by using a model, the mobile phone 100 may change the model. That is, in a process of providing a same AI model, the mobile phone 100 may use different models.

Optionally, in the process of providing an AI service by using a model, the mobile phone 100 may perform model selection when detecting the following trigger condition, and then continue to provide the AI service by using a model obtained through the selection.

Trigger condition 1: The mobile phone 100 automatically performs model selection when a model selected last time has been used for a preset period.

For example, the model selected last time by the mobile phone 100 is a model 1. After the mobile phone 100 has used the model 1 for a period of time (reaching the preset period) to predict an app that a user may tap next time, the mobile phone 100 automatically performs model selection. For example, the preset period may be one day (24 hours). In this case, the mobile phone 100 automatically performs model selection at 12:00 every night.

Trigger condition 2: The mobile phone 100 performs model selection when determining that a model selected last time is inaccurate.

For example, the mobile phone 100 selects a model 1 last time and uses the model 1 to predict an app that a user may tap next time, where the model 1 is evaluated as better. If an app that the user actually taps next time is different from an app that may be tapped next time and that is predicted by using the model 1, it indicates that the model 1 is inaccurate. In this case, the mobile phone 100 may perform model selection. Certainly, the mobile phone 100 may alternatively perform model selection after determining that the case (an app that the user actually taps next time is different from an app that may be tapped next time and that is predicted by using the model 1) occurs for a plurality of times (for example, exceeding a preset quantity of times, for example, three times).

It should be noted that because the user's behavior of operating the mobile phone 100 changes in real time (for example, the user originally taps iQIYI and Alipay for a comparatively small quantity of times, but later taps iQIYI and Alipay for a comparatively large quantity of times), an app that the user may tap next time and that the mobile phone 100 predicts by using the model selected last time is not an app that the user actually taps. In the foregoing manner, the mobile phone 100 may automatically perform model selection when the model selected last time is inaccurate, to improve accuracy of model selection and further provide the AI service more accurately.

It should be understood that in the foregoing content, the mobile phone 100 uses a historical record of the user's operation on the mobile phone (for example, in FIG. 3, a historical record of apps tapped by the user is used when a model is trained) to train or evaluate a model. Assuming that five applications are currently installed on the mobile phone 100, characteristic data collected by the mobile phone 100 includes a record generated when the user taps the five applications. In this case, after the mobile phone 100 trains a model, an obtained output result of the model is also one of the five applications (for example, in FIG. 8, results obtained after the mobile phone 100 trains the model include four applications: WeChat, Tmall, Taobao, and JD, and in a subsequent use process, the characteristic data is used as the input parameter of the model, and an obtained output result is one of the four results). When several of the five applications are uninstalled from the mobile phone 100, or the mobile phone 100 downloads a new application from a network side, the model selected last time does not know this information. Therefore, if the model selected last time is still used, an output result is still one of the five previously installed applications, but actually the user may tap the new application. It can be learned that the model selected last time is no longer suitable. Therefore, the mobile phone 100 may periodically select a model, or when detecting that an output result of the model selected last time is inaccurate, the mobile phone 100 automatically performs model selection.

It can be learned from the foregoing description that in a process of providing a same AI service, the mobile phone 100 may use different models. The mobile phone 100 may select a suitable model periodically or based on an actual case (for example, a prediction result of a model selected last time is inaccurate), thereby improving flexibility of model selection.

In the foregoing embodiment, after selecting a model, the mobile phone 100 obtains a model parameter of the model by training the model. The following describes another embodiment. In this embodiment, a model parameter is known. For example, one or more groups of model parameters of each model are pre-stored on the mobile phone 100. After selecting a model, the mobile phone 100 may select one group from a plurality of groups of model parameters of the model, and does not need to train the model to obtain the model parameters, thereby reducing a computing amount.

As shown in FIG. 9, the internal memory 121 further stores a model parameter library. The model parameter library includes a model parameter corresponding to each model. The example in which a model is the decision tree shown in FIG. 2 is still used. FIG. 10 shows a correspondence between a model and a model parameter according to an embodiment of this application. Assuming that the mobile phone 100 selects a model (for example, the decision tree), the mobile phone 100 may select a group of model parameters from a model parameter 1 and a model parameter 2. Assuming that the mobile phone 100 selects the model parameter 1, the mobile phone 100 does not need to train the model, and the evaluator may evaluate the selected model.

Figure 11:
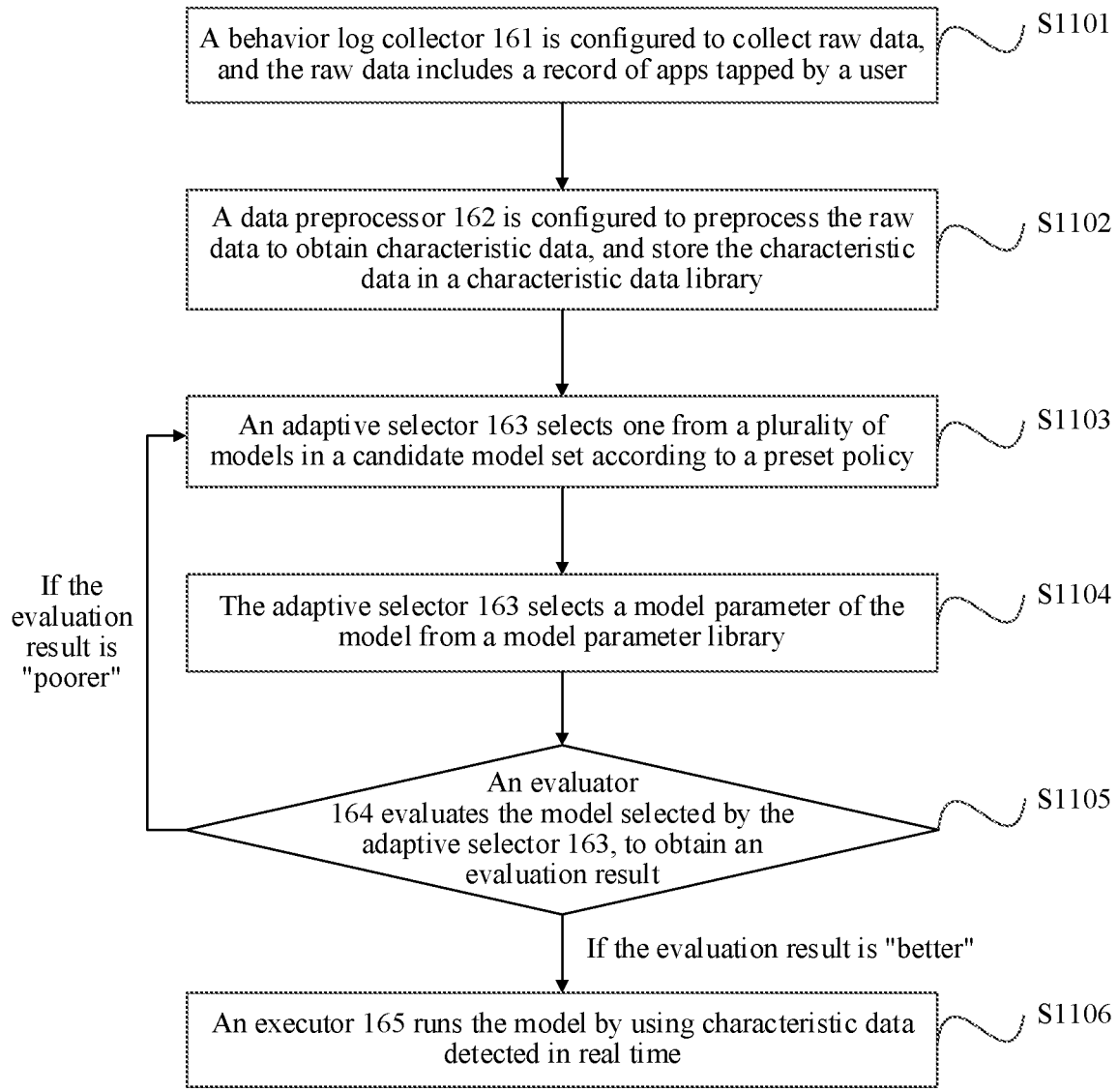
FIG. 11 is a schematic flowchart of another model selection method according to an embodiment of this application.

Therefore, FIG. 11 is a schematic flowchart of another model selection method according to an embodiment of this application. As shown in FIG. 11, the procedure includes that the processor 110 runs code of a behavior log collector, code of a characteristic data preprocessor, code of an adaptive selector, code of an evaluator, and code of an executor to perform the following process, where the code is stored in the internal memory 121.

S1101: The behavior log collector collects raw data, where the raw data includes a record of apps tapped by a user.

S1102: The data preprocessor preprocesses the raw data to obtain characteristic data, and store the characteristic data in a characteristic data library.

S1103: The adaptive selector selects one from a plurality of models in a candidate model set according to a preset policy.

S1104: The adaptive selector selects a model parameter of the model from a model parameter library.

S1105: The evaluator evaluates the model selected by the adaptive selector, to obtain an evaluation result. If the evaluation result is "better", S1106 is performed; or if the evaluation result is "poorer", S1103 is performed.

S1106: The executor runs the trained model by using characteristic data detected in real time.

It should be noted that a difference between the embodiment shown in FIG. 11 and the embodiment shown in FIG. 6 lies in that, in the embodiment shown in FIG. 11, the adaptive selector may select a group of model parameters from known model parameters of the model after selecting the model, and does not need to train the model to obtain the model parameters, thereby reducing a computing amount.

Certainly, in the embodiment shown in FIG. 11, the model parameter is known. For example, the model parameter may be a model parameter obtained after a designer trains the model in a manner similar to the foregoing manner before the mobile phone 100 is delivered, and then the model parameter is stored on the mobile phone 100 for use. For another example, the model parameter may alternatively be a model parameter obtained after the model is trained in a manner similar to the foregoing manner during use of the mobile phone 100, and the model parameter is stored for use in a subsequent process.

It should be noted that the embodiments shown in FIG. 6 and FIG. 11 may be implemented separately or in combination. For example, the mobile phone 100 selects a model, trains the model according to the procedure shown in FIG. 6, to obtain a model parameter, and then evaluates the model. When an evaluation result is "poor", the mobile phone 100 selects another model, determines a model parameter of the model in a manner shown in FIG. 11, and then evaluates the model.

It should be understood that the procedures shown in FIG. 6 and FIG. 11 may be alternatively executed by a cloud server. For example, the mobile phone 100 sends characteristic data to the cloud server, and the cloud server selects one from a plurality of models according to the procedure shown in FIG. 6, then runs the model for calculation by using the characteristic data as an input parameter of the model, to obtain an output result, and then feeds back the output result to the mobile phone 100.

All the foregoing embodiments use the scenario, as an example, in which the mobile phone 100 predicts, by running a model based on a record of apps tapped by a user, an app that the user may tap next time. Actually, the technical solutions provided in the embodiments of this application may alternatively be applicable to another application scenario. For example, when the user opens a display interface of Taobao in the mobile phone 100, a plurality of commodities are displayed on the display interface. A commodity currently tapped is a top, a commodity tapped last time is a sweater, and a commodity tapped penultimate time is a T-shirt. In this case, the mobile phone 100 may also predict, according to the model selection method provided in the embodiments of this application, a category of a commodity that the user may tap next time, and then recommend a commodity of the category to the user. In short, the technical solutions provided in the embodiments of this application may be applicable to: based on a user's habit of operating the mobile phone 100, predicting a next possible behavior of the user, or recommending a thing that the user may like to the user.

In the embodiment shown in FIG. 5 and FIG. 6 and the embodiment shown in FIG. 9 to FIG. 11, the characteristic data (that is, an input parameter) in the characteristic data library may be manually specified. For example, a designer may store preset characteristic data in the mobile phone 100, and the mobile phone 100 only needs to evaluate or train a model by using the preset characteristic data.

Therefore, in some other embodiments of this application, the mobile phone 100 may automatically search for characteristic data. FIG. 3 is used as an example. The mobile phone 100 may freely combine different parameters to obtain a characteristic parameter. For example, the mobile phone 100 may use only an app tapped penultimate time and an app tapped last time as input parameters, or may use an app tapped third-to-last time, an app tapped penultimate time, and an app tapped last time as input parameters.

Alternatively, in some other embodiments, the mobile phone 100 may automatically select another parameter other than parameters shown in FIG. 3 as an input parameter. For example, the mobile phone 100 may alternatively select an app currently tapped, duration of using a current app, a quantity of times/frequency at which a current app is used, an app tapped last time, duration of using an app tapped last time, a quantity of times/frequency at which an app tapped last time is used, an app tapped penultimate time, duration of using an app tapped penultimate time, a quantity of times/frequency at which an app tapped penultimate time is used, a current geographic location, a current time, and the like.

It should be noted that characteristic data automatically searched for by the mobile phone 100 in a model training process is consistent with characteristic data searched for by the mobile phone 100 in a model evaluation process. For example, both characteristic data used during model training and characteristic data used during model evaluation are apps tapped three consecutive times. When an evaluation result of a model is "better", the mobile phone 100 may fix a characteristic data form. That is, characteristic data includes apps tapped three consecutive times. Therefore, when using the model, the mobile phone 100 selects characteristic data in the fixed characteristic data form, for example, selects an app currently tapped, an app tapped last time, and an app tapped penultimate time as the characteristic data, that is, input parameters of the model.

The implementations of this application may be combined arbitrarily, to implement different technical effects.

In the foregoing embodiments provided in this application, the method provided in the embodiments of this application is described from a perspective that a terminal (the mobile phone 100) works as an execution body. To implement functions in the method provided in the foregoing embodiments of this application, the terminal may include a hardware structure and/or a software module, and implement the foregoing functions in a form of the hardware structure, the software module, or a combination of the hardware structure and the software module. Whether a specific function among the foregoing functions is performed in a manner of the hardware structure, the software module, or the combination of the hardware structure and the software module depends on particular applications and design constraints of the technical solutions.

An embodiment of the present application further provides a computer-readable storage medium. The storage medium may include a memory, and the memory may store a program. When the program is executed, a terminal is enabled to perform all or some of the steps performed by the terminal recorded in the foregoing method embodiments shown in FIG. 6 and FIG. 11.

An embodiment of the present application further provides a computer program product including an instruction. When the computer program product runs on a terminal, the terminal is enabled to perform all or some of the steps performed by the terminal recorded in the foregoing method embodiments shown in FIG. 6 and FIG. 11.

With descriptions of the foregoing embodiments, a person skilled in the art may clearly understand that the embodiments of this application may be implemented by hardware, firmware or a combination thereof. When this application is implemented by software, the foregoing functions may be stored in a computer-readable medium or transmitted as one or more instructions or code in the compute-readable medium. The compute-readable medium includes a computer storage medium and a communications medium, where the communications medium includes any medium that enables a computer program to be transmitted from one place to another. The storage medium may be any available medium accessible to a computer. The following is used as an example but is not limited thereto. The compute-readable medium may include a RAM, a ROM, an electrically erasable programmable read only memory (EEPROM), a compact disc read-only memory (CD-ROM), or other compact disc storage, a magnetic disk storage medium or another magnetic storage device, or any other medium capable of carrying or storing expected program code in a form of an instruction or a data structure and capable of being accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk and a disc used by the embodiments of this application includes a compact disc (CD), a laser disc, an optical disc, a digital video disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely embodiments of this application, but is not intended to limit the protection scope of this application. Any modification, equivalent replacement, improvement, or the like made according to the disclosure of this application shall fall within the protection scope of this application.

What is claimed is:

1. A model selection method, wherein the method comprises:
   obtaining in real time, by a terminal, first behavior data generated when a user operates the terminal;
   selecting, by the terminal according to a preset policy, a first model from a plurality of models stored on the terminal;
   running, by the terminal, the first model by using the first behavior data as an input parameter of the first model, to obtain a first output result;
   providing, by the terminal, a first artificial intelligence (AI) service based on the first output result;
   selecting, by the terminal, a second model from the plurality of models when the first model does not meet a condition;
   running, by the terminal, the second model by using second behavior data as an input parameter of the second model, to obtain a second output result, wherein the second behavior data is generated after the first behavior data, and is generated when the user operates the terminal; and
   continuing to provide, by the terminal, the first AI service based on the second output result.

2. The method according to claim 1, wherein before running, by the terminal, the first model, the method further comprises:
   evaluating, by the terminal, the first model; and
   wherein running, by the terminal, the first model comprises:
   when a result of evaluating the first model meets the condition, running, by the terminal, the first model by using the first behavior data as the input parameter of the first model, to obtain the first output result.

3. The method according to claim 2, wherein before evaluating, by the terminal, the first model, the method further comprises:
   determining, by the terminal, a value of the input parameter and a value of an output parameter; and either
   using, by the terminal, the determined value of the input parameter and the determined value of the output parameter in a formula of the first model, and determining a value of a model parameter of the first model, wherein the model parameter is a value of a parameter of the first model other than the input parameter and the output parameter;
   or
   determining, by the terminal, a value of the model parameter that corresponds to the first model.

4. The method according to claim 2, wherein evaluating, by the terminal, the first model comprises:
   obtaining, by the terminal, third behavior data generated when the user operates the terminal, wherein the third behavior data is generated before the first behavior data;
   running, by the terminal, the first model by using the third behavior data as the input parameter of the first model, to obtain a test result; and
   comparing, by the terminal, the test result with an actual result, wherein the actual result is an actual operation of the user performed after the third behavior data is obtained, wherein the test result is consistent with the actual result and the result of evaluating the first model meets the condition; or the test result is inconsistent with the actual result and the result of evaluating the first model does not meet the condition.

5. The method according to claim 1, wherein selecting, by the terminal according to the preset policy, the first model comprises:
randomly selecting, by the terminal, the first model from the plurality of models;
selecting, by the terminal, a model with a largest Q value according to a Q-table, wherein the Q-table comprises a Q value corresponding to each model of the plurality of models, and the Q value is related to a result of evaluating each model; or
selecting, by the terminal based on a current service, the first model corresponding to the current service.

6. The method according to claim 1, wherein the first output result is a next possible behavior of the user predicted after the first behavior data is obtained, and selecting, by the terminal, the second model comprises:
when a next possible behavior of the user predicted by using the first model is different from a next actual behavior of the user, selecting, by the terminal, the second model; or
when a duration of using the first model reaches a preset duration, selecting, by the terminal, the second model.

7. The method according to claim 1, wherein the first behavior data or the second behavior data comprises an application that the user has tapped a last three times; and
the first output result or the second output result is an application that the user may tap next time.

8. The method according to claim 4, wherein the third behavior data comprises an application tapped three consecutive times before an application tapped last time, and the actual result is an application tapped immediately before the application tapped three consecutive times.

9. The method according to claim 6, wherein that the next possible behavior of the user predicted by using the first model is different from the next actual behavior of the user comprises:
an application that the user may tap next time and that is predicted by using the first model is different from an application that the user actually taps next time.

10. The method according to claim 1, wherein providing, by the terminal, the first AI-related service based on the first output result or the second output result comprises:
preloading, by the terminal, the application that the user may tap next time;
shutting down, by the terminal, another application that is running in a background and that is not the application that the user may tap next time; or
outputting, by the terminal, prompt information used to prompt the application that the user may tap next time, and when detecting that the user determines the prompt information, loading, by the terminal, the application that the user may tap next time.

11. The method according to claim 1, wherein the first behavior data or the second behavior data comprises categories of commodities that the user tapped a last three times; and
the first output result or the second output result is a category of a commodity that the user may tap next time.

12. The method according to claim 4, wherein the third behavior data comprises a category of a commodity tapped three consecutive times before a category of a commodity tapped last time, and the actual result is a category of a commodity tapped immediately before the category of the commodity tapped three consecutive times.

13. The method according to claim 6, wherein that the next possible behavior of the user predicted by using the first model is different from the next actual behavior of the user comprises:
a category that is of a commodity that the user may tap next time and that is predicted by using the first model is different from a category of a commodity that the user actually taps next time.

14. The method according to claim 11, wherein providing, by the terminal, the first AI-related service based on the first output result or the second output result comprises:
preloading, by the terminal, a commodity that belongs to the category of the commodity that the user may tap next time;
outputting, by the terminal, prompt information, wherein the prompt information is used to prompt the category of the commodity that the user may tap next time, and when detecting that the user determines the prompt information, loading, by the terminal, the commodity that belongs to the category of the commodity that the user may tap next time; or
outputting, by the terminal, prompt information, wherein the prompt information is used to recommend a category of a commodity of interest to the user, and the category of the commodity of interest is the same as the category of the commodity that the user may tap next time.

15. The method according to claim 1, wherein the first model or the second model is one of a decision tree, a neural unit, a logistic regression algorithm, a naive Bayesian classification algorithm, a random forest algorithm, or a support vector machine algorithm.

16. A terminal, comprising:
a memory and a processor, wherein
the memory is configured to store one or more computer programs, and when the one or more computer programs stored in the memory are executed by the processor, the terminal is enabled to implement the following steps:
obtaining in real time first behavior data generated when a user operates the terminal;
selecting, according to a preset policy, a first model from a plurality of models stored on the terminal;
running the first model by using the first behavior data as an input parameter of the first model, to obtain a first output result;
providing a first artificial intelligence (AI) service based on the first output result;
selecting a second model from the plurality of models when the first model does not meet a condition;
running the second model by using second behavior data as an input parameter of the second model, to obtain a second output result, wherein the second behavior data is generated after the first behavior data, and is generated when the user operates the terminal; and
continuing to provide the first AI service based on the second output result.

17. The terminal according to claim 16, wherein before running the first model by using the first behavior data as the input parameter of the first model, the method further comprises:

evaluating the first model; and running the first model comprises:

when a result of evaluating the first model meets the condition, running the first model by using the first behavior data as the input parameter of the first model, to obtain the first output result.

18. The terminal according to claim 17, wherein before evaluating the first model, the method further comprises:

determining a value of the input parameter and a value of an output parameter; and either using the determined value of the input parameter and the determined value of the output parameter in a formula of the first model, and determining a value of a model parameter of the first model, wherein the model parameter is a value of a parameter of the first model other than the input parameter and the output parameter;

or determining, a value of the model parameter that corresponds to the first model.

19. The terminal according to claim 17, wherein evaluating the first model comprises:

obtaining third behavior data generated when the user operates the terminal, wherein the third behavior data is generated before the first behavior data;

running the first model by using the third behavior data as the input parameter of the first model, to obtain a test result; and comparing the test result with an actual result, wherein the actual result is an actual operation of the user performed after the third behavior data is obtained, wherein the test result is consistent with the actual result and the result of evaluating the first model meets the condition; or the test result is inconsistent with the actual result and the result of evaluating the first model does not meet the condition.

20. The terminal according to claim 16, wherein selecting, according to the preset policy, the first model comprises:

randomly selecting the first model from the plurality of models;

selecting a model with a largest Q value according to a Q-table, wherein the Q-table comprises a Q value corresponding to each model of the plurality of models, and the Q value is related to a result of evaluating each model; or selecting, based on a current service, the first model corresponding to the current service.

* * * * *